Oct. 11, 1966 M. K. HAYNES 3,278,732

HIGH SPEED MULTIPLIER CIRCUIT

Filed Oct. 29, 1963 19 Sheets-Sheet 1

INVENTOR.
MUNRO K. HAYNES

BY Ronald J. Kransdorf

AGENT

Oct. 11, 1966 M. K. HAYNES 3,278,732

HIGH SPEED MULTIPLIER CIRCUIT

Filed Oct. 29, 1963 19 Sheets-Sheet 4

Oct. 11, 1966 M. K. HAYNES 3,278,732

HIGH SPEED MULTIPLIER CIRCUIT

Filed Oct. 29, 1963 19 Sheets-Sheet 7

Oct. 11, 1966 M. K. HAYNES 3,278,732

HIGH SPEED MULTIPLIER CIRCUIT

Filed Oct. 29, 1963 19 Sheets-Sheet 11

R = 4 S = 3 C = 1

R=4; S=4; C=1

R=2 S=1 C=1

| | | ADDERS | | | | | | | | |
|---|---|---|---|---|---|---|---|---|---|---|
| | | 40a | 44a | 40b | 44b | 40c | 44c | 40d | 44d | PRODUCT |
| $\phi$ | 1 | $s\bar{c}$ | | $\bar{s}\bar{c}$ | | $s\bar{c}$ | | $\textcircled{s}\bar{c}$ | | 1 |
| | 2 | | $s\bar{c}$ | | $s\bar{c}$ | | $s\bar{c}$ | | $\textcircled{\bar{s}}c$ | 0 |
| | 1 | $\bar{s}\bar{c}$ | | $s\bar{c}$ | | $s\bar{c}$ | | $\textcircled{\bar{s}}c$ | | 0 |
| | 2 | | $s\bar{c}$ | | $\bar{s}\bar{c}$ | | $\bar{s}c$ | | $\textcircled{s}c$ | 1 |
| | 1 | $\bar{s}\bar{c}$ | | $s\bar{c}$ | | $s\bar{c}$ | | $\textcircled{s}\bar{c}$ | | 1 |
| | 2 | | $\bar{s}\bar{c}$ | | $\bar{s}\bar{c}$ | | $s\bar{c}$ | | $\textcircled{s}\bar{c}$ | 1 |
| | 1 | $\bar{s}\bar{c}$ | | $\bar{s}\bar{c}$ | | $\bar{s}\bar{c}$ | | $\textcircled{s}\bar{c}$ | | 1 |
| | 2 | | $\bar{s}\bar{c}$ | | $\bar{s}\bar{c}$ | | $\bar{s}\bar{c}$ | | $\textcircled{\bar{s}}\bar{c}$ | 0 |

FIG. 13

R=2 S=2 C=1

| | | ADDERS | | | | | | | | | | |
|---|---|---|---|---|---|---|---|---|---|---|---|---|
| | | 40a | 44a | 40b | 44b | 40c | 44c | 40d | 44d | 80a | 80b | PRODUCT |
| $\phi$ | 1 | $\bar{c}$ | | $\bar{c}$ | | $\bar{c}$ | | $\bar{c}$ | | | | |
| | 2 | s | $\bar{c}$ | $\bar{s}$ | $\bar{c}$ | s | $\bar{c}$ | s | $\bar{c}$ | | | |
| | 1 | $\bar{c}$ | s | $\bar{c}$ | $\bar{s}$ | $\bar{c}$ | s | $\bar{c}$ | s | $\bar{c}$ | | |
| | 2 | $\bar{s}$ | $\bar{c}$ | $\bar{s}$ | $\bar{c}$ | s | c | $\bar{s}$ | $\bar{c}$ | $\textcircled{s}$ | c | 1 |
| | 1 | $\bar{c}$ | s | $\bar{c}$ | $\bar{s}$ | $\bar{c}$ | $\bar{s}$ | $\bar{c}$ | s | c | $\textcircled{\bar{s}}$ | 0 |
| | 2 | $\bar{s}$ | $\bar{c}$ | $\bar{s}$ | $\bar{c}$ | s | $\bar{c}$ | $\bar{s}$ | $\bar{c}$ | $\textcircled{\bar{s}}$ | $\bar{c}$ | 0 |
| | 1 | $\bar{c}$ | $\bar{s}$ | $\bar{c}$ | $\bar{s}$ | $\bar{c}$ | s | $\bar{c}$ | $\bar{s}$ | $\bar{c}$ | $\textcircled{s}$ | 1 |
| | 2 | $\bar{s}$ | $\bar{c}$ | $\bar{s}$ | $\bar{c}$ | $\bar{s}$ | $\bar{c}$ | $\bar{s}$ | $\bar{c}$ | $\textcircled{s}$ | $\bar{c}$ | 1 |
| | 1 | | $\bar{s}$ | | $\bar{s}$ | | $\bar{s}$ | | $\bar{s}$ | $\bar{c}$ | $\textcircled{s}$ | 1 |
| | 2 | | | | | | | | | $\textcircled{s}$ | $\bar{c}$ | 1 |
| | 1 | | | | | | | | | | $\textcircled{\bar{s}}$ | 0 |

FIG. 14a

```
                   1011                      1011
                   1011                      1011
                    0 1                       1 1
                  0 1                       1 1
                0 0                       0 0
              0 1                       1 1
CONSOLIDATION  001011 FIRST PARTIAL PRODUCT  110111 SECOND PARTIAL PRODUCT
              110111  SECOND "      "
              1111001  PRODUCT
```

FIG. 14b

R = 4 S = 2 C = 1

| | ADDERS | | | | | | | | | | | | | | | | | | | |
|---|---|---|---|---|---|---|---|---|---|---|---|---|---|---|---|---|---|---|---|---|
| $\phi$ | 40a | 44a | 60a | 70a | 40b | 44b | 60b | 70b | 40c | 44c | 60c | 70c | 40d | 44d | 60d | 70d | 80d | 80a | 80b | 80c |
| 1 | $\bar{C}$ | | | | $\bar{C}$ | | | | $\bar{C}$ | | | | $\bar{C}$ | | | | | | | |
| 2 | S | $\bar{C}$ | | | $\bar{S}$ | $\bar{C}$ | | | S | $\bar{C}$ | | | S | $\bar{C}$ | | | | | | |
| 3 | | S | $\bar{C}$ | | | $\bar{S}$ | $\bar{C}$ | | | S | $\bar{C}$ | | | S | $\bar{C}$ | | | | | $\bar{\bar{C}}$ |
| 4 | | | $\bar{S}$ | $\bar{C}$ | | | $\bar{S}$ | $\bar{C}$ | | | S | C | | | $\bar{S}$ | $\bar{C}$ | C | | | (S) |
| 1 | $\bar{C}$ | | | S | $\bar{C}$ | | | $\bar{S}$ | $\bar{C}$ | | | $\bar{S}$ | $\bar{C}$ | | | S | ($\bar{S}$) | C | | |
| 2 | $\bar{S}$ | $\bar{C}$ | | | $\bar{S}$ | $\bar{C}$ | | | S | $\bar{C}$ | | | $\bar{S}$ | $\bar{C}$ | | | | ($\bar{S}$) | C | |
| 3 | | $\bar{S}$ | $\bar{C}$ | | | $\bar{S}$ | $\bar{C}$ | | | S | $\bar{C}$ | | | $\bar{S}$ | $\bar{C}$ | | | | (S) | $\bar{C}$ |
| 4 | | | $\bar{S}$ | $\bar{C}$ | | | $\bar{S}$ | $\bar{C}$ | | | $\bar{S}$ | $\bar{C}$ | | | $\bar{S}$ | $\bar{C}$ | $\bar{C}$ | | | (S) |
| 1 | | | | $\bar{S}$ | | | | $\bar{S}$ | | | | $\bar{S}$ | | | | $\bar{S}$ | (S) | $\bar{C}$ | | |
| 2 | | | | | | | | | | | | | | | | | | (S) | $\bar{C}$ | |
| 3 | | | | | | | | | | | | | | | | | | | ($\bar{S}$) | $\bar{C}$ |

FIG. 15

1011
1011
1 1
1 1
0 0
1 1
1100011 FIRST PARTIAL PRODUCT
1011 SECOND PARTIAL PRODUCT
1111001 FIRST CONSOLIDATED PRODUCT
0000 THIRD PARTIAL PRODUCT
1111001 FINAL PRODUCT 1011
1011
1
1
0
1
1011 2ND PARTIAL PRODUCT 1011
1011
0
0
0
0
0000 3RD P.P.

FIG. 16b

R = 2 S = 3 C = 1

| | | ADDERS | | | | | | | | | | | | |
|---|---|---|---|---|---|---|---|---|---|---|---|---|---|---|
| | | 40a | 44a | 40b | 44b | 40c | 44c | 40d | 44d | 80b | 80a | 90b | 90a | PRODUCT |
| φ | 1 | $\bar{C}$ | | $\bar{C}$ | | $\bar{C}$ | | $\bar{C}$ | | | | | | |
| | 2 | | $\bar{C}$ | | $\bar{C}$ | | $\bar{C}$ | | $\bar{C}$ | | | | | |
| | 1 | $S\bar{C}$ | | $\bar{S}\bar{C}$ | | $S\bar{C}$ | | $S\bar{C}$ | | | | | | |
| | 2 | | $S\bar{C}$ | | $\bar{S}\bar{C}$ | | $S\bar{C}$ | | $SC$ | $\bar{C}$ | | | | |
| | 1 | $\bar{C}\bar{S}$ | | $\bar{C}\bar{S}$ | | $\bar{C}\bar{S}$ | | $C\bar{S}$ | | | $\bar{C}$ | | | |
| | 2 | | $\bar{C}S$ | | $\bar{C}\bar{S}$ | | $\bar{C}S$ | | $\bar{C}\bar{S}$ | $S\bar{C}$ | | $\bar{C}$ | | |
| | 1 | $\bar{S}\bar{C}$ | | $\bar{S}\bar{C}$ | | $\bar{S}\bar{C}$ | | $\bar{S}\bar{C}$ | | | $S\bar{C}$ | | $C$ | |
| | 2 | | $\bar{S}\bar{C}$ | | $\bar{S}\bar{C}$ | | $\bar{S}\bar{C}$ | | $S\bar{C}$ | $\bar{C}\bar{S}$ | | $\textcircled{S}C$ | | 1 |
| | 1 | $\bar{S}$ | | $\bar{S}$ | | $\bar{S}$ | | $S$ | | | $\bar{C}S$ | | $\textcircled{\bar{S}}\bar{C}$ | 0 |
| | 2 | | $\bar{S}$ | | $\bar{S}$ | | $\bar{S}$ | | $\bar{S}$ | $\bar{S}\bar{C}$ | | $\bar{C}\textcircled{\bar{S}}$ | | 0 |
| | 1 | | | | | | | | | | $\bar{S}\bar{C}$ | | $\bar{C}\textcircled{S}$ | 1 |
| | 2 | | | | | | | | | $\bar{C}\bar{S}$ | | $\textcircled{S}\bar{C}$ | | 1 |
| | 1 | | | | | | | | | | $\bar{S}$ | | $\textcircled{S}\bar{C}$ | 1 |
| | 2 | | | | | | | | | $\bar{S}$ | | $\textcircled{S}$ | | 1 |
| | 1 | | | | | | | | | | | | $\textcircled{\bar{S}}$ | 0 |

FIG. 16a

United States Patent Office 3,278,732

Patented Oct. 11, 1966

3,278,732

HIGH SPEED MULTIPLIER CIRCUIT

Munro K. Haynes, Chappaqua, N.Y., assignor to International Business Machines Corporation, New York, N.Y., a corporation of New York Filed Oct. 29, 1963, Ser. No. 319,783

20 Claims. (Cl. 235—164)

This invention relates to multiplier circuits and more particularly to multiplier circuits using carry-save addition.

The times required to generate the sum and the carry in the adders of a multiplier circuit are often different and either or both of these times may be different from the recycle time of the logical elements in the adder. In order to synchronize the operation of the multiplier, it is generally necessary to delay either the sum output, the carry output, or both so that they arrive at the input of the next adder to use them in synchronization with each other and when that adder, having completed its recycled time, is ready to receive them. For example, if the adder generates a carry in one unit of time, a sum in two units of time, and uses logical elements having a recycle time four units long, the carry would have to be delayed three units of time and the sum two units before being applied to the next adder to use them. It can be seen that, in the above example, productive functions are being performed during only two units of a four unit cycle. If the delays generally employed in a multiplier of this type could be eliminated and productive operations performed during the entire recycle time of the adder elements, the efficiency and speed of the multiplier could be substantially increased.

It is therefore a general object of this invention to provide efficient, high-speed, carry-save multipliers.

A more specific object of this invention is to provide carry-save multipliers which have productive operations being performed during the entire recycle time of the adder elements.

Another object of this invention is to provide carry-save multipliers which require neither the sum output nor the carry output from an adder to be delayed before being applied to the next adder to utilize them. This object is compromised in some embodiments of the invention where delays are required before applying sum outputs to consolidation adders for partial products, but, as will be seen, these delays do not slow the operation.

A further object of this invention is to provide an algorithm for designing carry-save multipliers of the type indicated above which does not require the sum or the carry to be delayed provided the recycle time of the adder elements and the sum time are integral multiples of the carry time.

In accordance with these objects, this invention provides multipliers which multiply using carry-save addition. The multiplier uses an array of R adders per multiplicand bit, each of which adders generates a carry in one unit of time, a sum in S units of time, and has a repetition rate of R. In the multipliers being considered, S or R may be equal to 1, but at least S or R is greater than 1. The multiplicand bit is applied under control of the multiplier bits to one input of the adders of that bit, the multiplicand being applied to only one adder during each unit of time. The carry output from each adder is applied to a second input of the next adder for the same bit. The adders are considered to be formed in a closed ring so that a carry output from the last adder is applied as one input for the first adder for the same bit. The sum output from each adder is applied to a third input of an adder S bit positions and S adder positions advanced from the adder in which the sum is generated. This results in S partial products being generated. Where S is greater than 1, additional adders are provided for consolidating the S partial products into a final product.

The foregoing and other objects, features and advantages of the invention will be apparent from the following more particular description of preferred embodiments of the invention, as illustrated in the accompanying drawings.

Figure 11A:
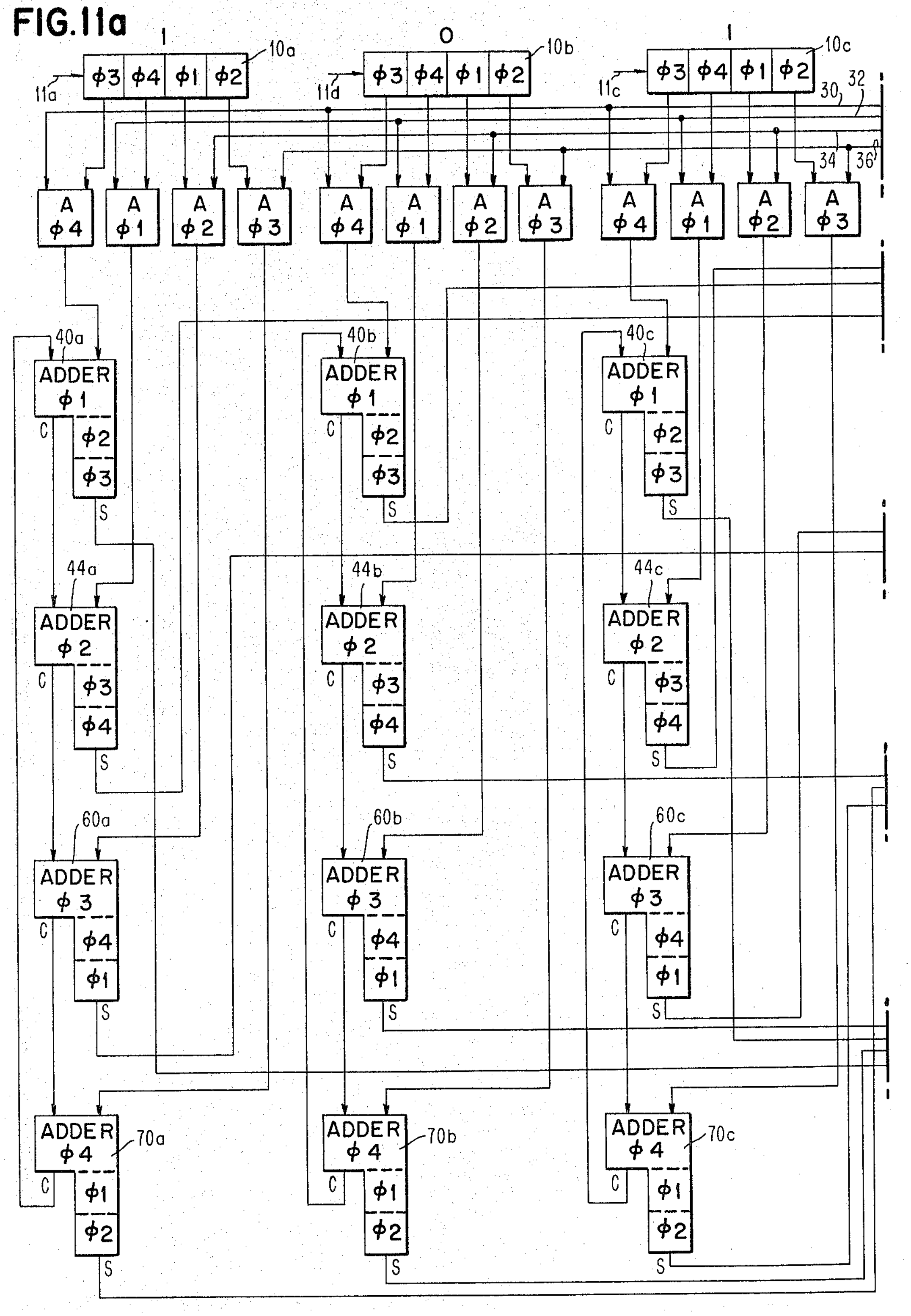
FIGS. 11*a*–11*b* are combined to form a schematic block diagram of another embodiment of the invention.
Figures 11, 11B:
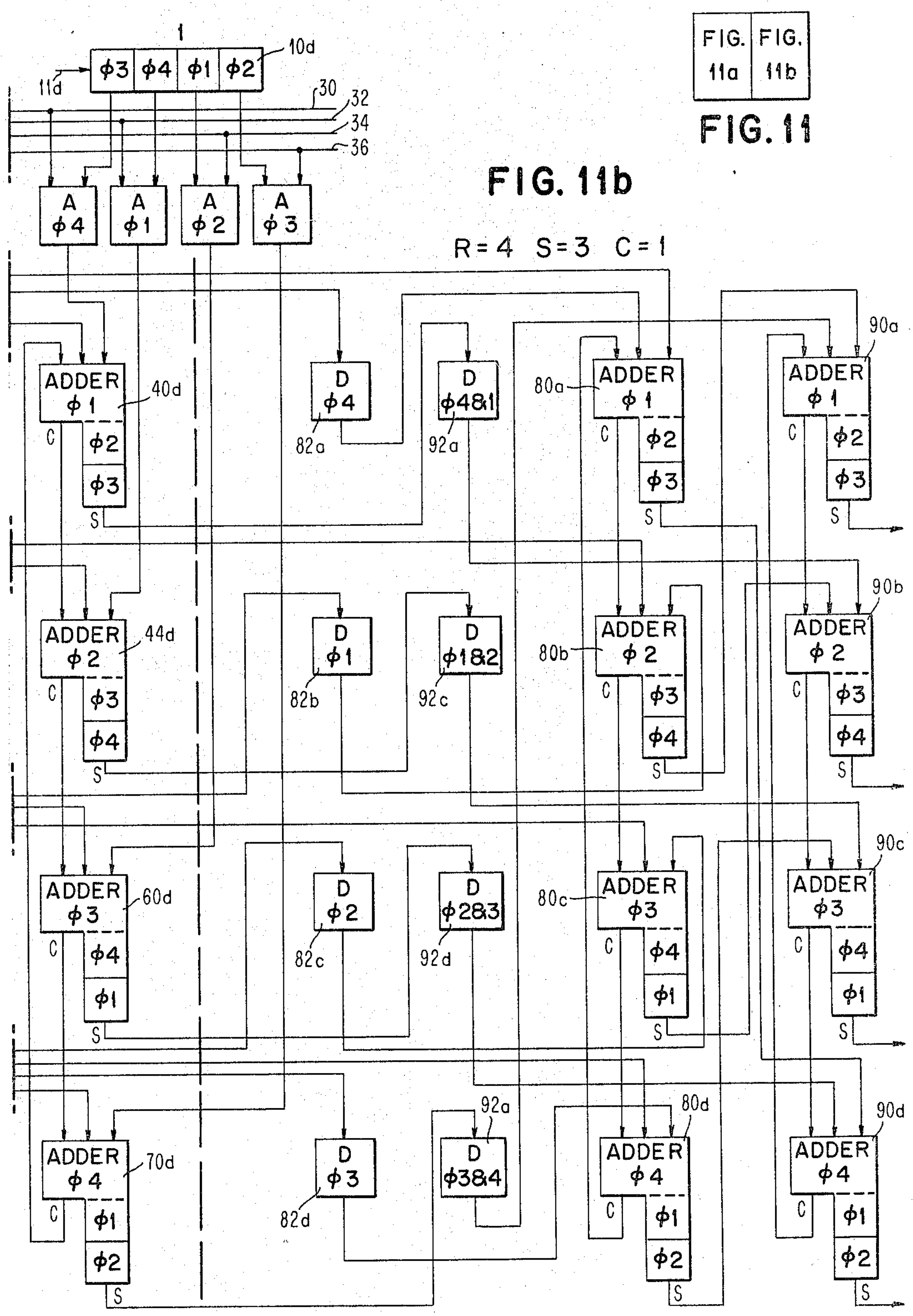
FIG. 11 is a diagram showing how

FIGS. 11*a*–11*b*, when combined, form a schematic block diagram of another embodiment of the invention.

Figure 12A:
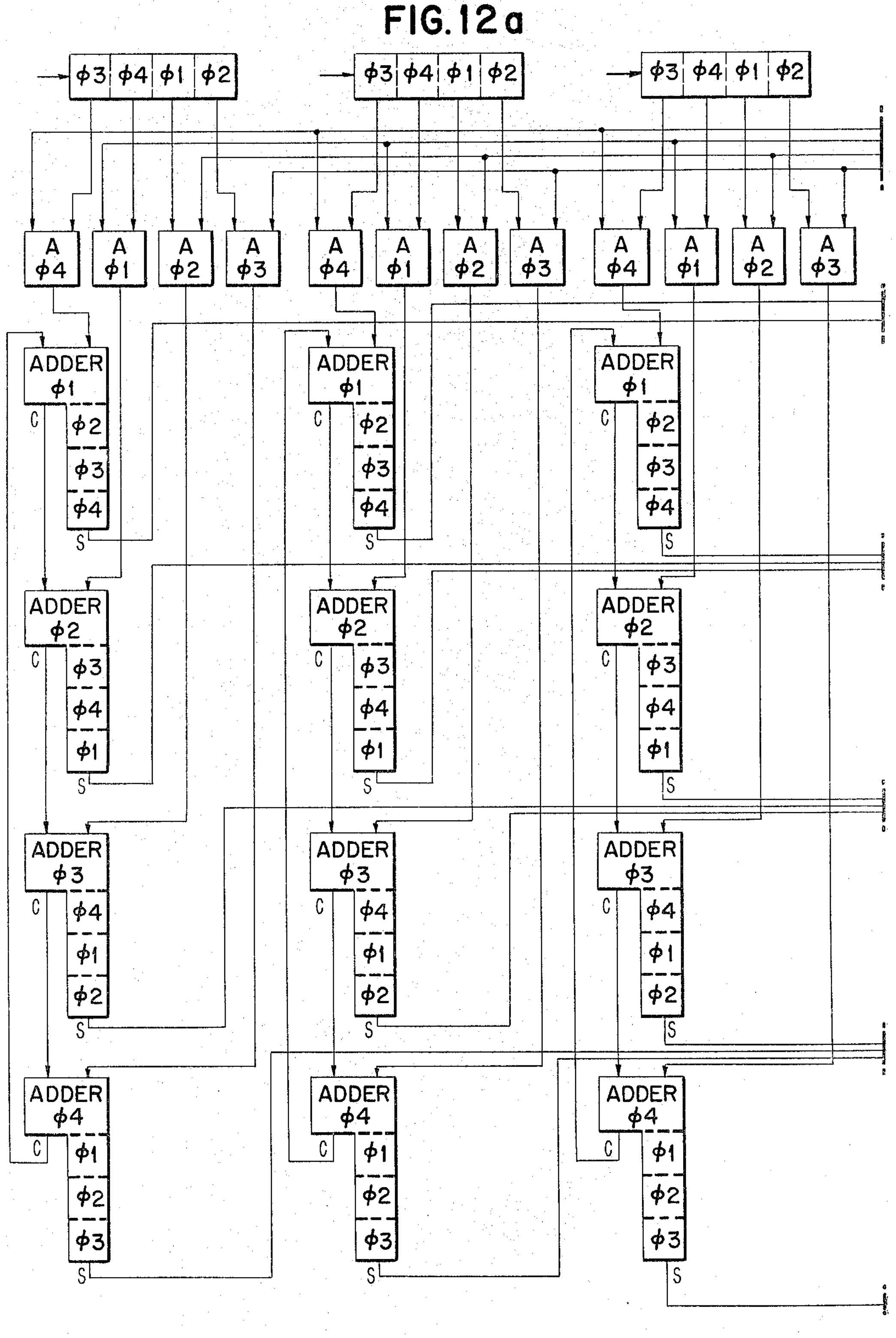
Figure 12B:
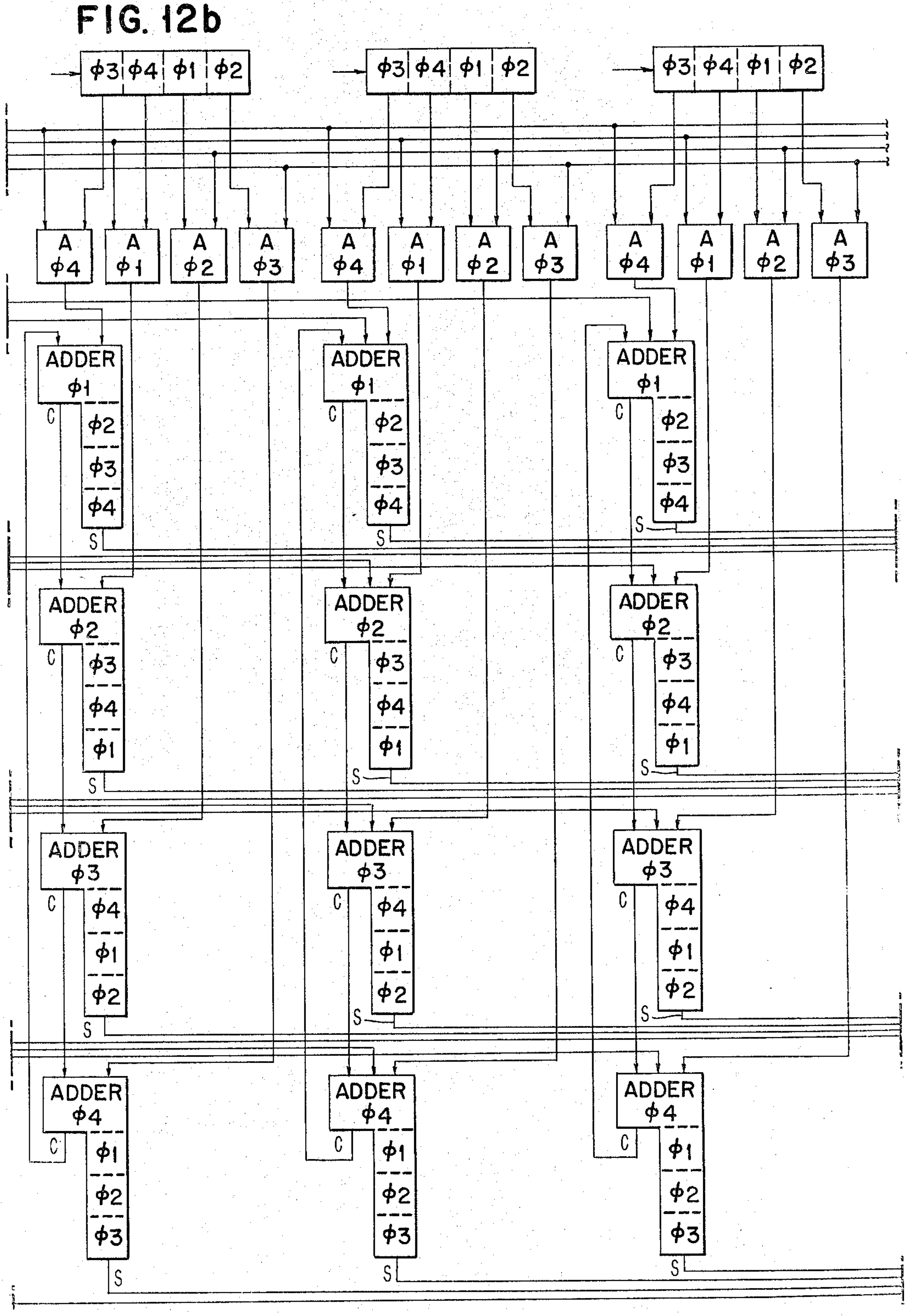
Figure 12:
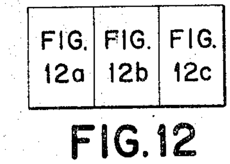
Figure 12C:
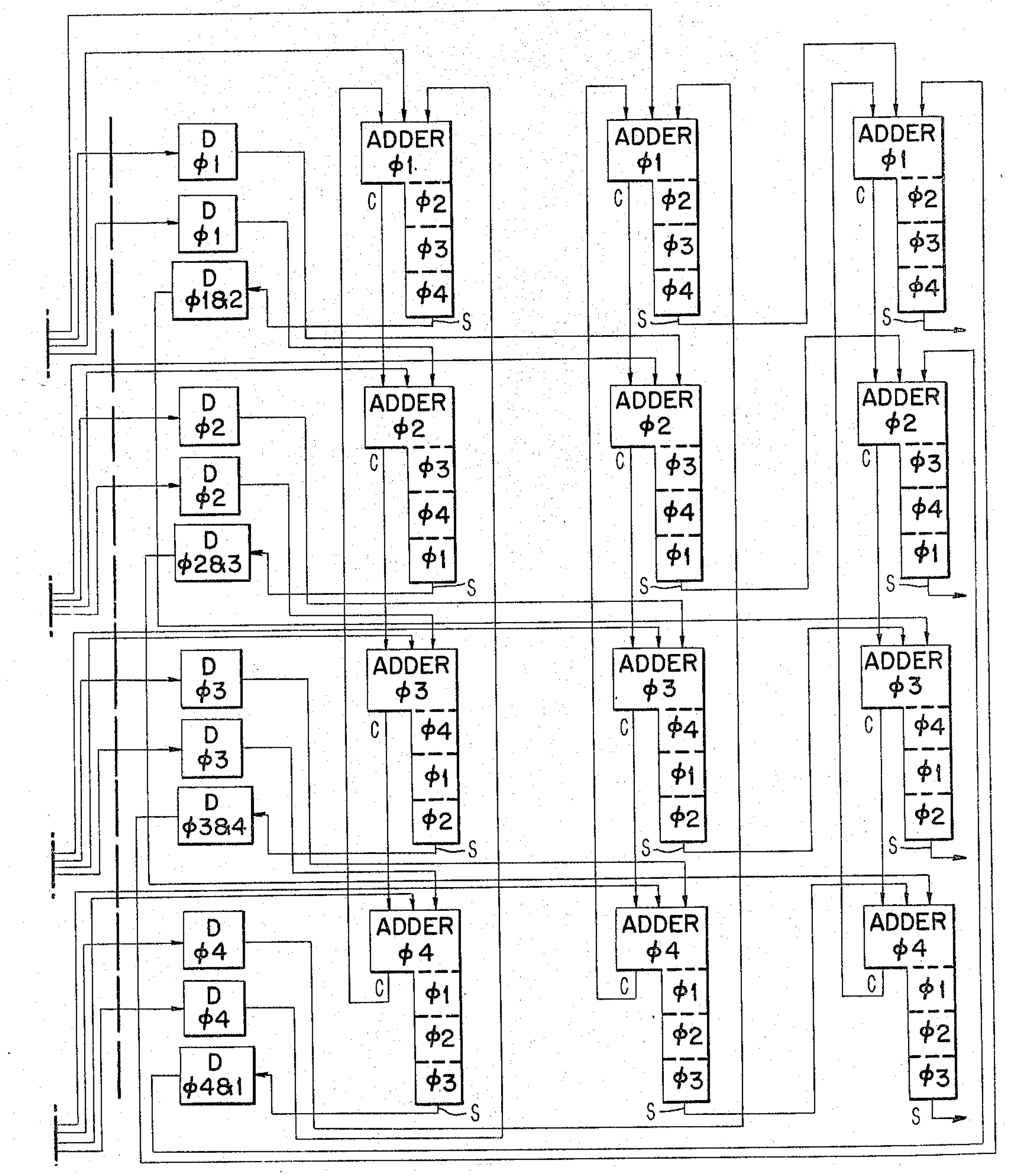

FIG. 12 is a diagram showing how FIGS. 12*a*–12*c* are combined to form a schematic block diagram of still another embodiment of the invention.

FIGS. 12*a*–12*c*, when combined, form a schematic block diagram of still another embodiment of the invention.

Figure 1:
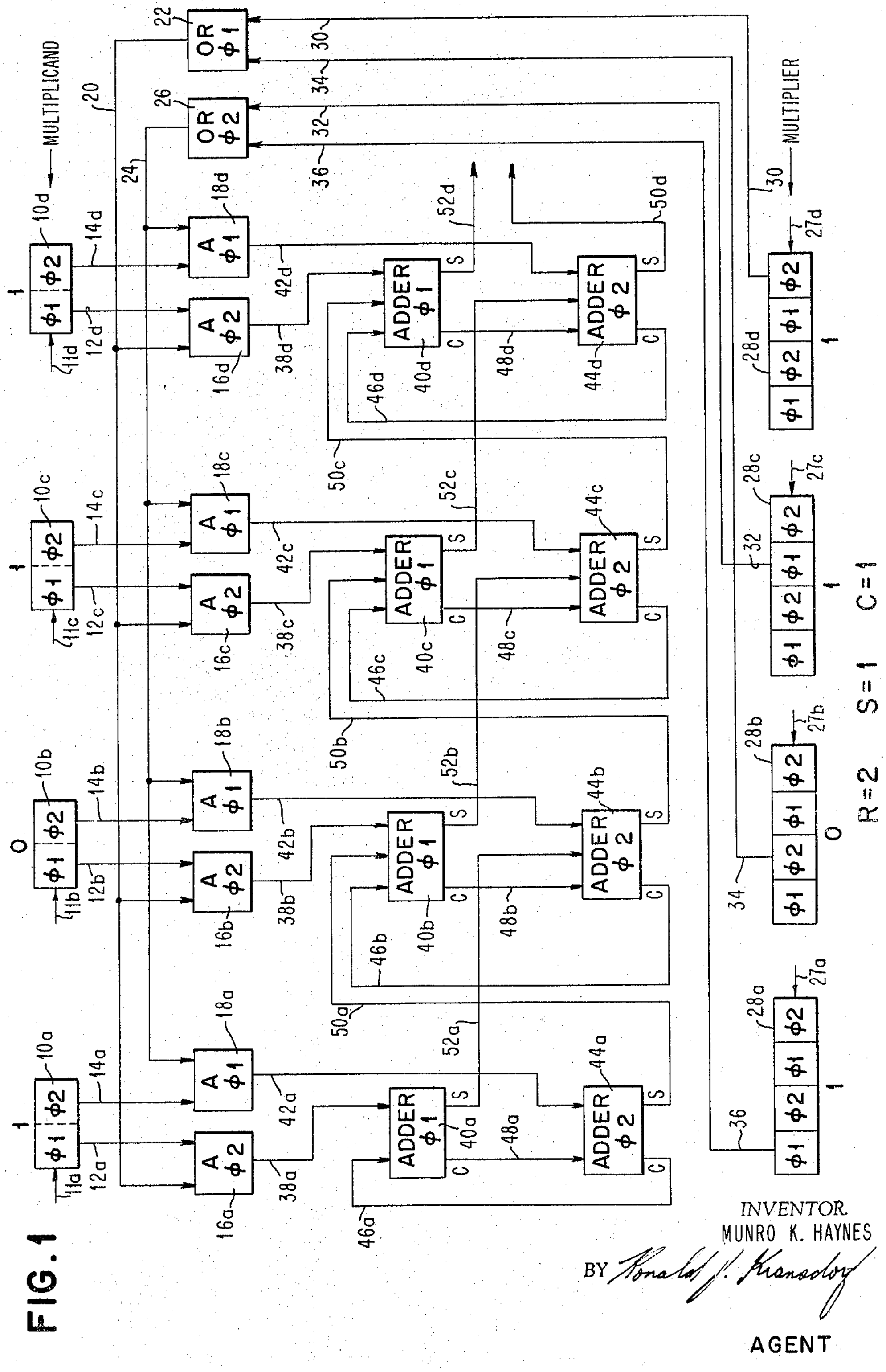
FIGS. 1–10 are schematic block diagrams of various embodiments of the invention.

FIG. 13 is a chart illustrating the operation of the embodiment of the invention shown in FIG. 1.

Figure 5:
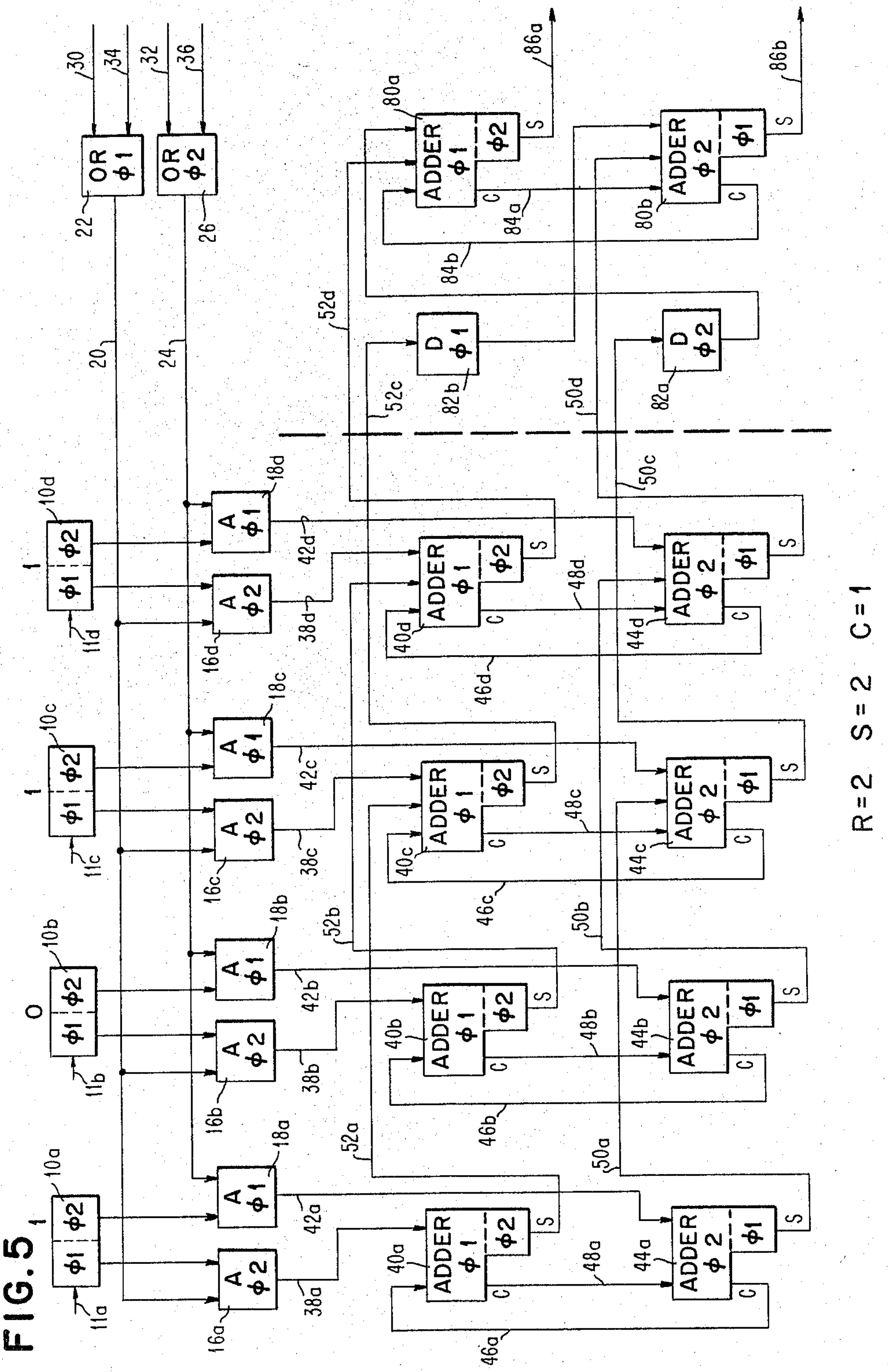

FIG. 14*a* is a chart illustrating the operation of the embodiment of the invention shown in FIG. 5.

FIG. 14*b* is an example showing how multiplication is performed in the embodiment of the invention shown in FIG. 5.

Figure 7:
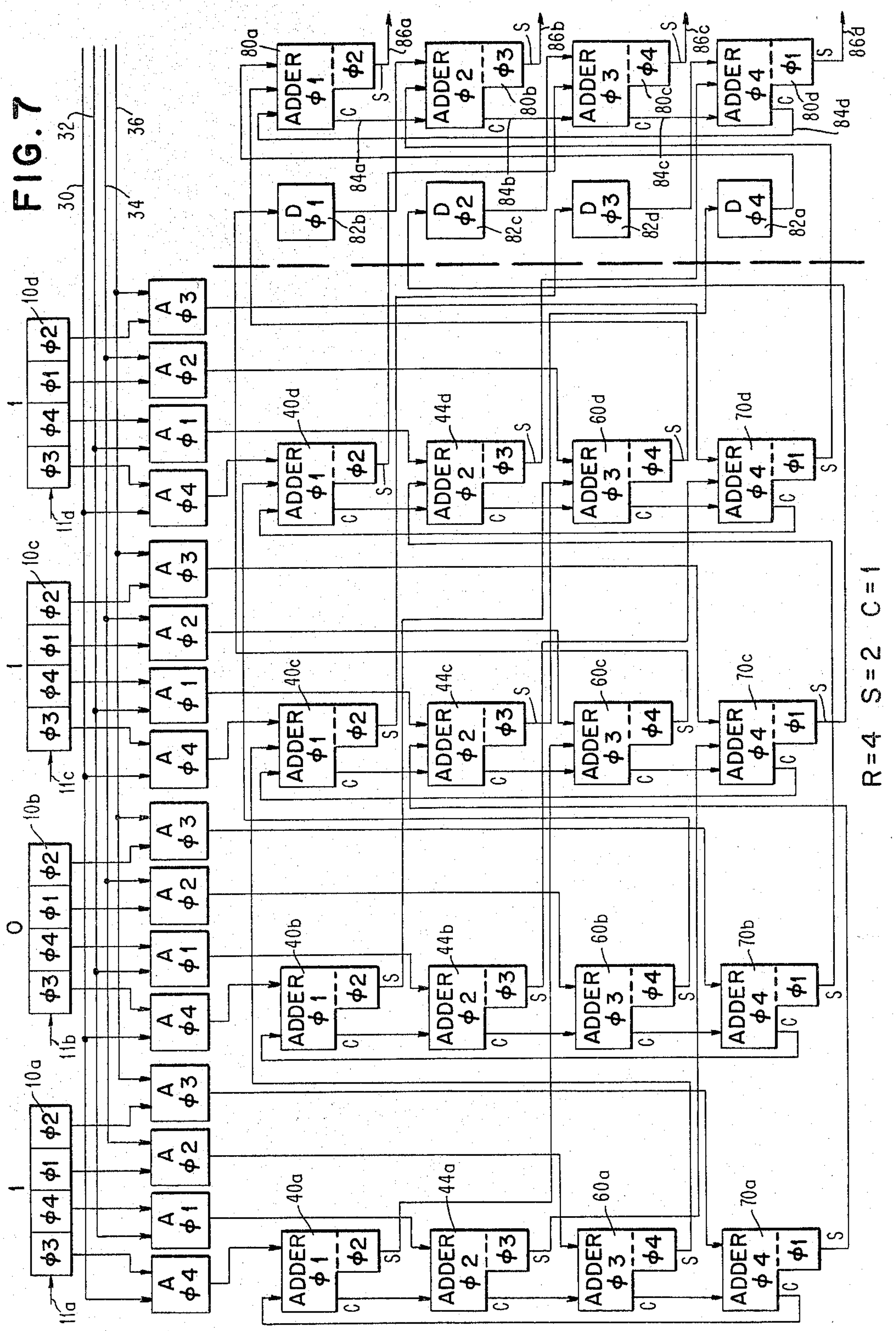

FIG. 15 is a chart illustrating the operation of the embodiment of the invention shown in FIG. 7.

Figure 9:
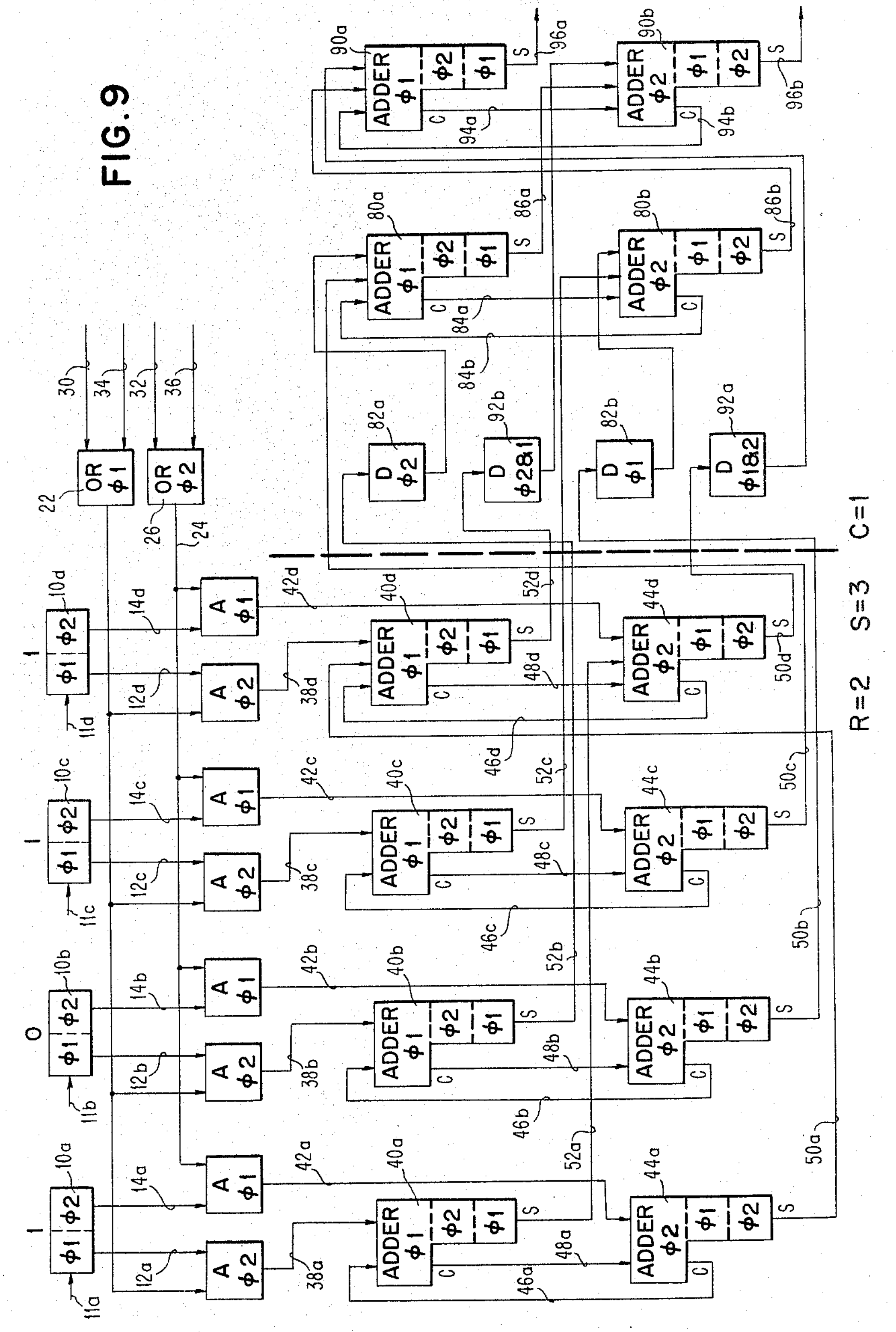

FIG. 16*a* is a chart illustrating the operation of the embodiment of the invention shown in FIG. 9.

FIG. 16*b* is an example showing how multiplication is performed in the embodiment of the invention shown in FIG. 9.

Figure 17:
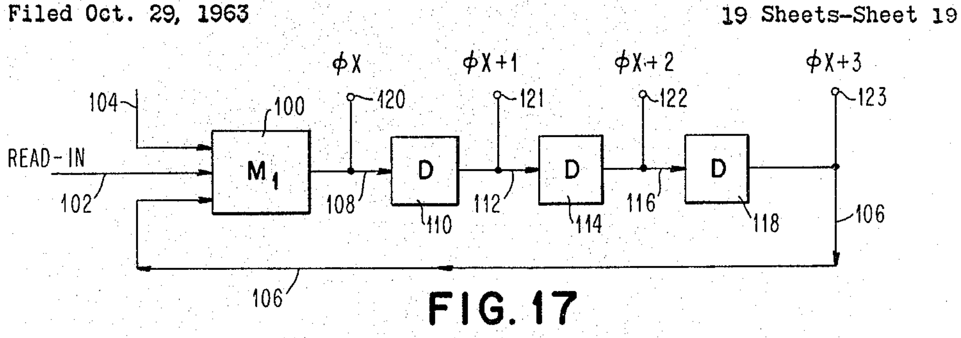

FIG. 17 is a schematic block diagram of a digit circulator suitable for use either as is or in modified form in the embodiments of the invention shown in FIGS. 1–10, 11*a*–11*b* and 12*a*–12*c*.

Figure 18:
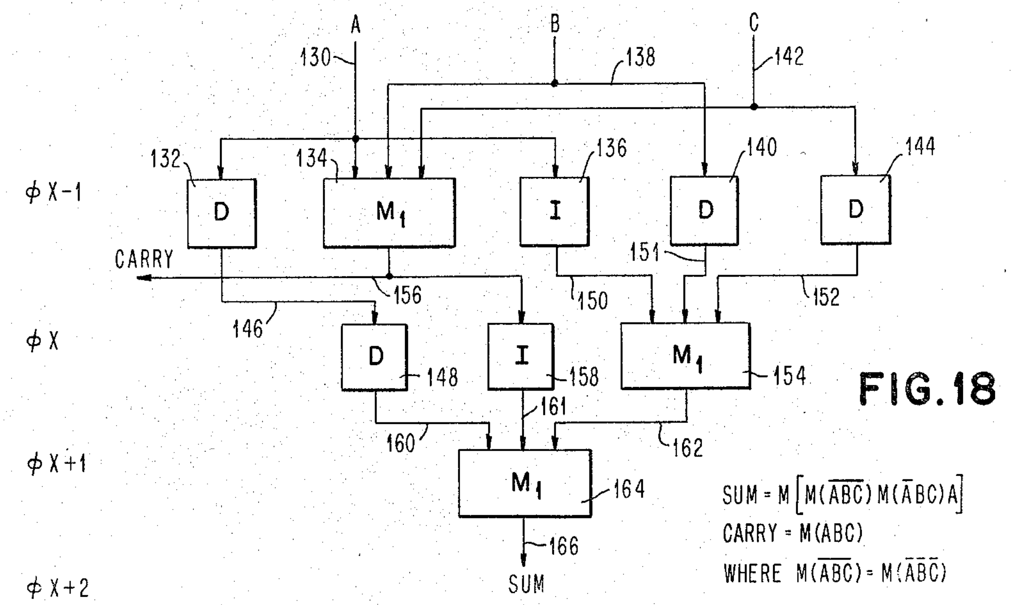

FIG. 18 is a schematic block diagram of an adder suitable for use in the embodiments of the invention shown in FIGS. 8–10 and 11*a*–11*b*.

Figure 19:
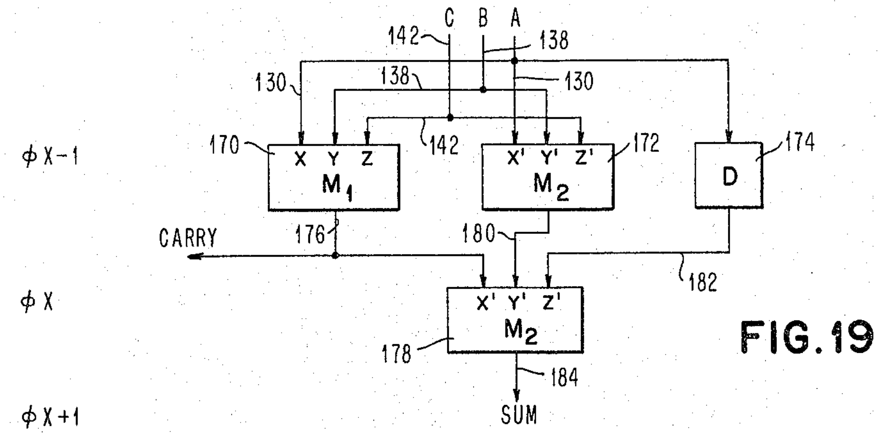

FIG. 19 is a schematic block diagram of an adder suitable for use in the embodiments of the invention shown in FIGS. 4–7.

In describing the various embodiments of the invention shown in FIGS. 1–10, 11*a*–11*b* and 12*a*–12*c*, inputs and outputs are said to occur at various phases. For purposes of the present discussion, a phase may be considered to be an integral sub-multiple of the recycle time of the logical element being employed. For example, if the logical elements being employed have a recycle time of 4, the circuit will have four phases. In the figures, the numbers appearing in each block or part of a block indicate the phase at which that block or part of block generates an output. An input to that block occurs during the preceding phase. The blocks are lined up so that all adders or part of adders in a given horizontal row generate an output at the same phase.

Also, in discussing the figures, the letters, S, C, and R are employed. The significance of these letters are as follows:

$S$=the number of phases required by the adders to genrate a sum output (i.e., the time delay of the sum output).

$C$=the number of phases required by the adders to generate a carry output (i.e., the time delay of the carry output).

$R$=the number of phases required by the logical elements employed to recycle (i.e., the recycle time of the logical elements).

Referring now to the bottom of FIG. 1, it is seen that the adders employed in this circuit generate both a sum and a carry in one phase and that the logical elements in these adders have a recycle time of 2. To simplify the required circuitry, the embodiment of the invention shown in FIG. 1 (and those shown in FIGS. 2–10 and 11*a*–11*b*) multiply only a four-bit multiplicand by a four-bit multiplier. The four bits of the multiplicand are stored in two-phase digit circulators **10*a*–10*d* by lines 11*a*–11*d*, respectively, with the most significant bit of the multiplicand being in digit circulator 10*a* and the least significant bit in 10*d*. An N-bit multiplicand requires N digit circulators 10. Each digit circulator 10 is a closed ring shift register which presents the multiplicand bit circulating therein at its left-side output line 12*a*–12*d* at phase 1 time and the multiplicand bit circulating therein at its right-side output line 14*a*–14*d* at phase 2 time. A suitable digit circulator circuit is described later with reference to FIG. 17. Where suitable components are available, a bistable device having D.-C. outputs may be substituted for each of the digit circulators 10*a*–10*d***.

Output lines **12*a*–12*d* are connected as one input to AND gates 16*a*–16*d*, respectively. Output lines 14*a*–14*d* are connected as one input to AND gates 18*a*–18*d*, respectively. The other input to AND gates 16*a*–16*d* is output line 20 from OR gate 22. OR gate 22 generates an output at phase 1 time. The other input to AND gates 18*a*–18*d* is output line 24 from OR gate 26. OR gate 26 generates an output signal at phase 2** time.

The four bits of the multiplier are applied in parallel over lines **27*a*–27*d* to open-ring digit circulators 28*a*–28*d*. The most significant bit of the multiplier is stored in digit circulator 28*a* and the least significant digit in digit circulator 28*d*. As with the multiplicand, there is a digit circulator for each bit of the multiplier and therefore, for an M-bit multiplier, there would be M digit circulators 28. Each digit circulator 28 is a four-position shift register. Unlike the circulators 10*a*–10*d*, for the multiplicand, digit circulators 28*a*–28*d* are not closed ring circuits. The bits of the multiplier shift from right to left in digit circulators 28*a*–28*d*. The first ouput from digit circulators 28*a*–28*d* is therefore the low order digit on output line 30 from the right-most position of digit circulator 28*a*. This output occurs at phase 2 time and is applied as one input to OR gate 22. At the next phase 1 time, digit circulator 28*c* generates an output signal on line 32 from its second-from-the-right-position which is applied as one input to OR gate 26. At the next phase 2 time, digit circulator 28*b* generates an output signal on line 34 from its third-from-the-right-position which is applied as a second input to OR gate 22 and at the following phase 1 time, digit circulator 28*a* generates an output signal on line 36, from its fourth-from-its-right-position which is applied as a second input to OR gate 26**.

From the above, it is seen that the bits of the multiplier are used to gate the bits of the multiplicand through AND gates **16*a*–16*d* and 18*a*–18*d*. Output lines 38*a*–38*d* from AND gates 16*a*–16*d*, respectively, are connected as one input to adders 40*a*–40*d*. Ooutput lines 42*a*–42*d* from AND gates 18*a*–18*d*, respectively, are connected as one input to adders 44*a*–44*d*, respectively. The second input to adders 40*a*–40*d* is the carry output on lines 46*a*–46*d*, respectively, from adders 44*a*–44*d*. The second input to adders 44*a*–44*d*, respectively, is the carry output on output lines 50*a*–50*c*, respectively, from adders 44*a*–44*c*. third input to adders 40*b*–40*d*, respectively, are the sum output lines 50*a*–50*c*, respectively, from adders 44*a*–44*c*. Sum output line 50*d* from adder 44*d* is connected as one input to an output shift register (not shown). The third input to adders 44*b*–44*d* are the sum output lines 52*a*–52*c* from adders 40*a*–40*c*, respectively. Sum output line 52*d* from adder 40*d*** is the other input to the output shift register (not shown).

To illustrate the operation of the circuit shown in FIG. 1, assume that it is desired to multiply the binary number 1011 (multiplicand) by the binary number 1011 (multiplier). The result of this multiplication is the binary number 1111001.

The multiply operation begins at the first phase 1 time with the bits of the multiplier being applied through lines **27*a*–27*d* to multiplier digit circulators 28*a*–28*d*. At the first phase 2 time the bits of the multiplicand are applied through lines 11*a*–11*d* to multiplicand digit circulators 10*a*–10*d* and multiplier digit circulator 28*d* applies its one bit through line 30 to OR gate 22. At the next phase 1 time, OR gate 22 applies the conditioning signal through line 20 to AND gates 16*a*–16*d* and digit circulators 10*a*-10*d* apply the bits of the multiplicand to the other input of these AND gates. At this same phase 1 time, digit circulator 28*c* is applying the next bit of the multiplier through line 32 to OR gate 26. At the next phase 2 time, three things are happening. First AND gates 16*a*–16*d* are applying the first bit of the multiplicand through lines 38*a*–38*d* to adders 40*a*–40*d*, respectively. Second, OR gate 26 is applying a conditioning signal through line 24 to gate the bits of the multiplicand into AND gates 18*a*–18*d*. Finally, digit circulator 28*b* is applying the third bit of the multiplier, the zero bit, through line 34 to OR gate 22. At the second phase 1 time, four things are happening. First, adders 40*a*–40*d* are generating sum and carry outputs as indicated in the first row of the chart of FIG. 13. In this chart an S or a C means a sum or a carry output from the indicated adder at the indicated phase time while a $\overline{S}$ or a $\overline{C}$ means no sum or no carry from that adder at that phase time. Second, AND gates 18*a*-18*d* are applying the bits of the multiplicand to adders 44*a*–44*d*, respectively, under control of the second bit of the multiplier. Third, OR gate 22 is applying the third bit of the multiplier, in this example, a zero, to conditioning line 20. Finally, digit circulator 28*a* is applying the most significant bit of the multiplier through line 36 to OR gate 26**.

Since shift registers **28*a*–28*d* are not ring registers, after the second phase 1 time, no further signals are applied to lines 30, 32, 34, or 36 and therefore, after the signal on line 36 has been applied through OR gate 26 to line 24, the multiplicand bits stored in digit circulators 10*a*–10*d* are no longer applied to one input of adders 40*a*–40*d* and 44*a*–44*d***.

For the above example, FIG. 13 shows the outputs from the adders at the various phase times. It can be seen that the first sum output from adder **40*d* on line 52*d* is a one-bit. This is the least significant bit of the final product. At successive phase times, adders 44*d* and 40*d*** generate successively more significant bits of the product until the entire product has been generated. Looking at the circled sum outputs in the last two columns of the chart of FIG. 13 and substituting one-bits for the S's and zero-bits for the $\overline{S}$'s, it is seen that the desired product, namely 01111001 is obtained.

Figure 2:
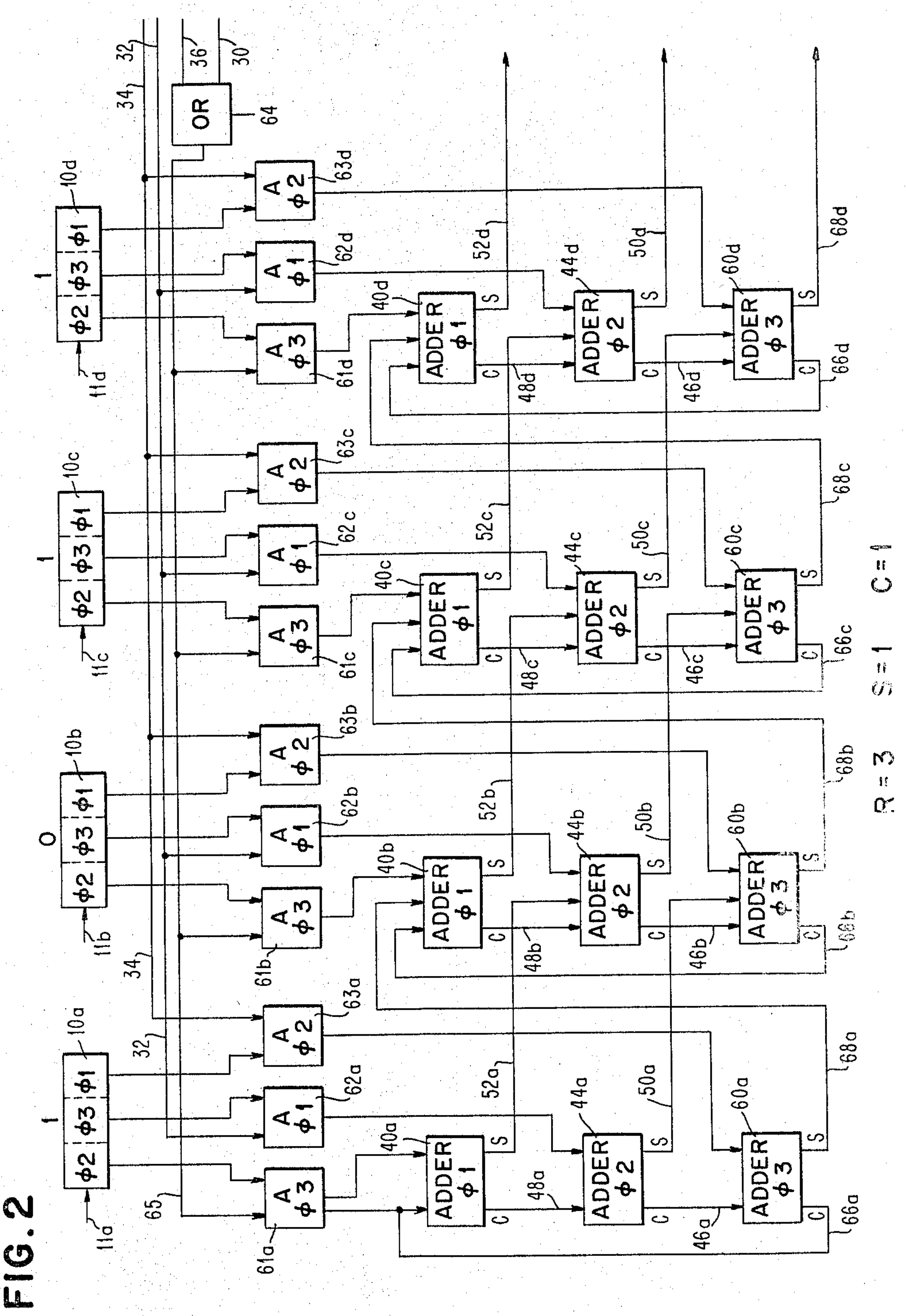

FIG. 2 shows a multiplier circuit which is similar to that shown in FIG. 1, the primary difference being that the adders used now have a recycle time of 3 rather than 2. In this figure, and in the figures to follow, like reference numerals have been used to identify like elements. Since the adders in FIG. 2 have a recycle time of three, even though the sum output and the carry output are generated in one phase, three phases must pass before an adder may be used again. Therefore, the procedure followed in FIG. 1 of applying the sum output at phase 2 from a second row adder 44 to the input of the first row adder 40 for the preceding bit and for applying the carry output from this adder to the first row adder for the same bit cannot be followed in the circuit of FIG. 2. The reason for this is that, at phase 2, the first row adders have not recovered from their previous use and are not ready to receive an input. A third row of adders 60a–60d is therefore required for useful operations to be performed during all three phases of the logical-element-recycle time.

The other differences between the circuit of FIG. 1 and FIG. 2 are:

(a) The bits of the multiplicand are stored in 3-cycle closed-ring shift registers (digit circulators) rather than 2-phase digit circulators;

(b) Since there are three adders, three AND gates 61–63 are required to gate the multiplicand bit into these adders;

(c) Output lines 32 and 34 from multiplier digit circulators 28c and 28b, respectively (FIG. 1) are connected directly to conditioning inputs of AND gates 62 and 63, respectively, while output lines 30 and 36 from digit circulators 28d and 28a, respectively, (FIG. 1) are connected through on OR gate 64 (FIG. 2) and a line 65 as the conditioning input to the AND gates 61;

(d) The carry outputs from adders 44 on lines 46 are connected as one input to adders 60 and the carry outputs from adders 60 on line 66 are connected as one input to adders 40 for the same multiplicand bit while the sum output from adders 44a–44c on lines 50a–50c are applied as one input to adders 60b–60d and the sum outputs from adders 60a–60c on lines 68a–68c as one input to adders 40b–40d. The sum outputs from adders 40d, 44d and 60d on lines 52d, 50d and 68d, respectively, are applied to an output shift register (not shown).

Since the digit circulators 28a–28d for storing the multiplier are the same for all embodiments of the invention, these circulators are shown only in FIG. 1. In FIGS. 2–10, 11a–11b and 12a–12c, only the output lines 30, 32, 34 and 36 from these digit circulators are shown.

Except for obvious differences due to the additional adder-per-bit, the operation of the circuit shown in FIG. 2 is identical to that shown in FIG. 1 and will not be described in detail.

Figure 3:
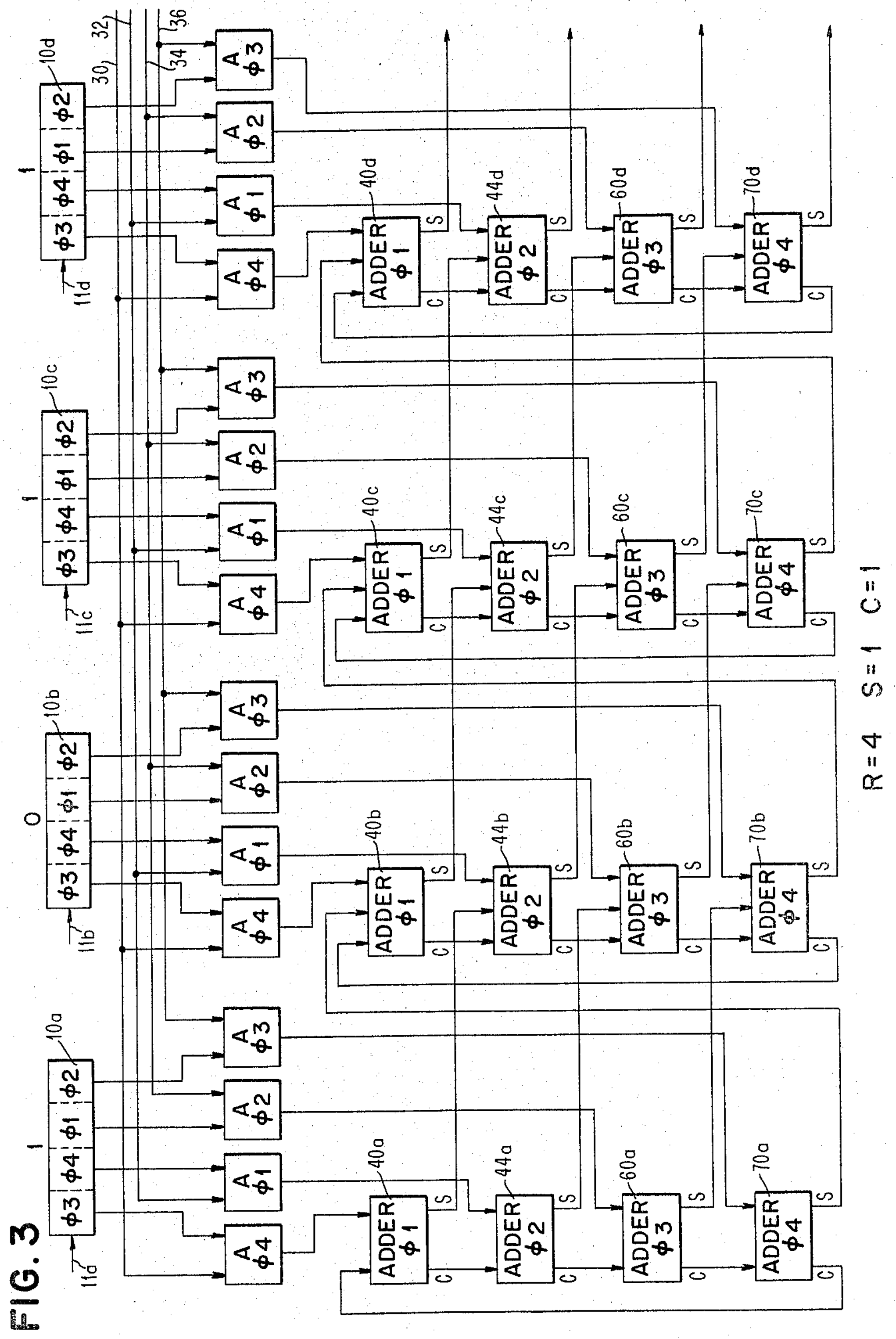

FIG. 3 shows still another circuit using adders which generate a sum and a carry output in one phase. The adders used in this embodiment of the invention differ from those previously described only in that the recycle time of the logical elements used is four. This results in a problem similar to that described with reference to FIG. 2 and necessitates the use of a fourth adder 70 per-multiplicand bit. Since 4-phase adders are being used, and there are four adders 40, 44, 60 and 70 per-multiplicand bit, 4-phase digit circulators 10a–10d are used for the multiplicand bits and the lines 30, 32, 34 and 36 from the digit circulators for the multiplier bits are connected directly as conditioning inputs to the AND gates which gate the multiplicand bits into the adders without any intervening OR gates. Again the operation of the circuit is sufficiently similar to the operation of the circuit shown in FIG. 1 as not to require additional description.

Figure 4:
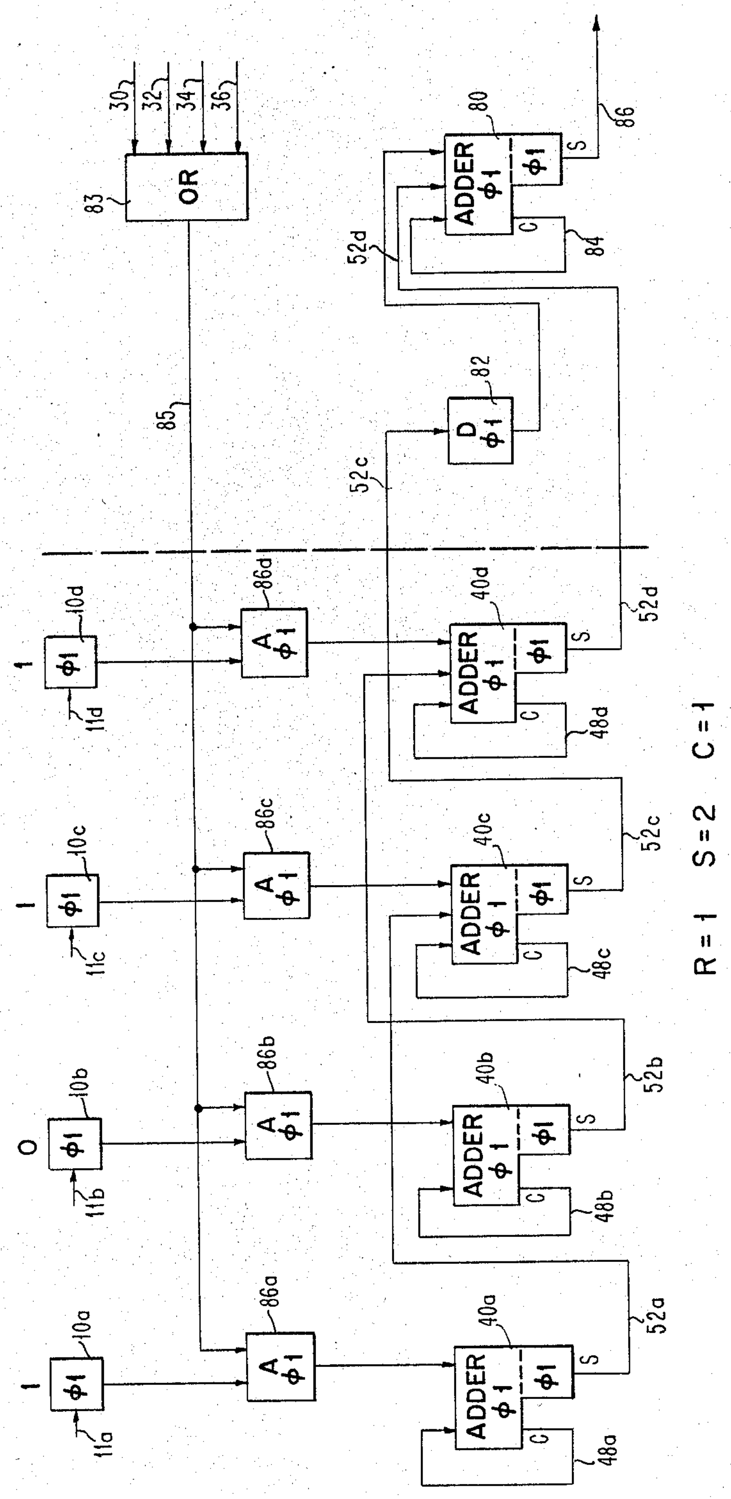

FIG. 4 shows a circuit using adders which generate a carry in one phase time but require two phases to generate a sum. The added box at the bottom of each adder is included to represent the additional 1-phase delay in generating a sum output. The logical elements used in this circuit have recycle time of one phase. The requirement of two phases to generate a sum presents a problem in that a carry bit for a given stage is generated and applied to one input of an adder which is recycled and ready to receive it, but the sum bit from the preceding stage has not yet been generated so that, unless the carry is delayed one phase, proper synchronization between the sum and carry bits does not exist. To overcome this problem, the circuit is designed to form two partial products which are consolidated in a byte adder 80 to give the final product. A 1-phase delay 82 is introduced in one of the inputs to the byte adder 80 but, as will be seen later, this does not prevent productive operations from being performed during all phase times.

Since only a single adder-per-multiplicand bit is required, only a single AND gate 86 per-multiplicand bit is required to gate a multiplicand bit into the adder and only a single-phase digit circulator 10 is required to store a multiplicand bit. There being only a single AND-gate-per-multiplicand bit, output lines 30, 32, 34 and 36 from multiplier digit circulators 28a–28d (FIG. 1), are applied through an OR gate 83 to a single conditioning line 85. A signal on a carry output line 48a–48d from each adder 40a–40d is applied back after one phase as one input to the same adder and the sum output on lines 52a–52b from the two higher-order adders 40a and 40b, respectively, are applied as one input to the adders two positions advanced from them, i.e., adders 40c and 40d, respectively. Sum output line 52c from adder 40c is connected through delay 82 as one input to consolidation adder 80 and sum output line 52d from adder 40d is connected as a second input to this adder. Carry output line 84 from adder 80 is the third input to this adder. Sum output line 86 from adder 80 is connected to an output shift register (not shown). The operation of the circuit shown in FIG. 4 being simpler than that of the circuit shown in FIG. 5, it can be easily understood once the operation of the latter circuit, which operation will be described presently, is understood. Therefore, the operation of the circuit of FIG. 4 will not be described.

Referring now to FIG. 5, it is seen that the adders employed differ from those shown in FIG. 4 in that their logical elements have a recycle time of 2. Since both R and S are 2, the circuit of FIG. 5 presents problems similar to those encountered in both FIGS. 1 and 4.

In the circuit of FIG. 5, since R is equal to 2, two adders 40 and 44 per bit are required. The carry output from each adder is applied to the next adder to be used for the same bit. The sum output from each adder cannot be applied to one input of the next adder to be used for the next multiplicand bit because, since S is equal to 2, the sum is not generated until one phase after this input would be required. Therefore, the sum output from each adder is applied to one input of an adder two bit positions advanced and two adder positions advanced from the adder generating the sum. Since there are only two adders-per-bit in FIG. 5, the sum output is actually applied to the adder in the same row but two-bit-positions advanced from that generating the sum. The circuitry for applying the multiplicand bits to the adder under control of the multiplier bit is identical to that shown in FIG. 1.

As will be seen later, multiplication in the circuit of FIG. 5 results in two partial products being formed, which partial products must be consolidated. Consolidation is accomplished in adders 80a and 80b. The inputs to adder 80a are carry output line 84b from adder 80b, output line 52d from adder 40d and the output from 1-phase delay 82a. The input to 1-phase delay 82a is sum output line 50c from adder 44c. The inputs to adder 80b are carry output line 84a from adder 80a, sum output line 50d from adder 44d, and the output from 1-phase delay 82b. The input to 1-phase delay 82b is sum output line 52c from adder 40c. The final product is applied to a shift register (not shown) by sum output lines 86a and 86b from consolidation adders 80a and 80b, respectively. The lowest order bit of the product appears on line 86a followed by the next lowest order bit on line 86b with successive bits appearing alternately on the two sum output lines.

Before describing in detail the manner in which the circuit of FIG. 5 operates, the manner in which the circuit performs multiplication will first be described. Referring to FIG. 14b, it is seen that a first partial product is formed by multiplying alternate bits of the multiplicand, starting with the least significant bit, by the bits of the multiplier. The second partial product is formed by multiplying alternate bits, starting with the next-to-the-least-significant bit of the multiplicand, by the bits of the multiplier. The final product is formed by adding the second partial product to the first partial product in adders 80*a* and 80*b*. The manner in which these two partial products are generated is such that the second partial product is properly oriented with respect to the first when the addition is performed.

The operation of the circuit of FIG. 5 may be understood by observing the outputs from the adders at various phase times shown in FIG. 14*a* for the previously described example where the multiplicand and multiplier are both 1011. The manner of applying the multiplicand bits to the adders under control of the multiplier bits is identical to that described with reference to FIG. 1. Referring to the last two columns of the chart of FIG. 14*a*, it is seen that if the sum outputs at successive phase times from consolidation adders 80*a*–80*b* (these sum outputs being circled in the chart) are strung out with the first sum output from adder 80*a* being the least siginficant bit and with one bits being substituted for a sum (S) output and zero bits for a not-sum ($\overline{S}$) output, the desired product 01111001 is obtained.

Figure 6:
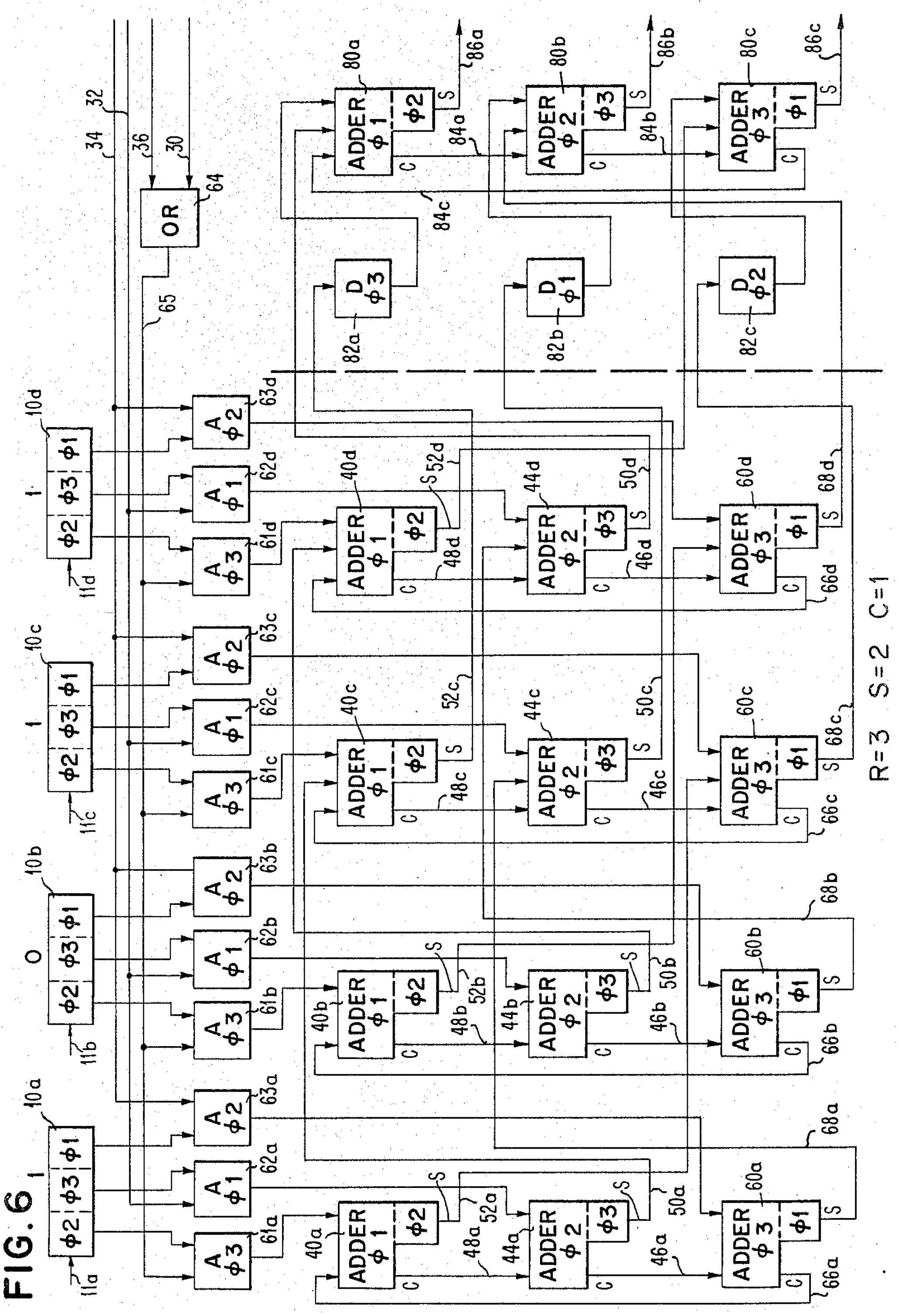

FIG. 6 shows an embodiment of the invention which differs from that shown in FIG. 5 only in that the logical elements of the adders used have a recycle time of 3 rather than 2. When, for example, adder 44*a* generates a carry output at phase 2 time, adder 40*a* is not yet recycled and conditioned to receive it. Therefore, a third adder 60 per-multiplicand bit is required. For the same reason, a third consolidation adder 80*c* is required. The multiplicand inputs under control of the multiplier bits on lines 30, 32, 34 and 36 are identical to those shown in FIG. 2. The carry output from each added is connected to one input of the next adder to be utilized for the same multiplicand bit, the carry outputs from adders 60*a*–60*d* being connected by lines 66*a*–66*d* to the inputs of adders 40*a*–40*d*, respectively. Similarly, carry outputs from the consolidation adders 80*a*–80*c* are connected by lines 84*a*–84*c* to one input of the next succeeding adder 80*b*–80*a*, respectively. The sum outputs from the adders for the highest-order multiplicand bit and the next-to-the-highest-order multiplicand bit are connected to one input of adders two adder positions (rows) and two bit positions advanced from the adder generating the sum output. The sum outputs from the adders 40*c*, 44*c* and 60*c* for the next-to-the-lowest-order multiplicand bit are connected through 1-phase delays 82*a*–82*c*, respectively, to one input of the consolidation adder 80 which is three adder positions (rows) advanced from the adder generating the sum. Since there are only three adders, this adder is the one in the same row as the adder generating the sum. Finally, the sum outputs from the adders for the least significant multiplicand bit are connected directly to the consolidation adder 80 which is two adder positions (rows) advanced from the one generating the sum.

The operation of the circuit shown in FIG. 6 is sufficiently similar to that of the circuits shown in FIGS. 5 and 7 to not require individual description. A chart for the circuit of FIG. 6, similar to FIG. 14*a* would show that sum outputs on lines 86*a*–86*c* during successive phase times form the desired product.

FIG. 7 shows still another embodiment of the invention, which embodiment differs from that shown in FIGS. 2 and 3 in that the recycle time for the logical elements in the adders is 4. As before, S is equal to 2 and C is equal to 1. Therefore, for reasons previously indicated, four adders-per-multiplicand-bit are required and for the same reason, four consolidation adders 80*a*–80*d* are required. As with FIG. 3, the bits of the multiplicand are stored in 4-phase ring digit circulators 10*a*–10*d* and four AND gates, each conditioned by a different one of the multiplier bits at successive phase times are used to gate the multiplicand bits into the adders. As before, the carry output from each adder is connected to the next adder of the same column (the same multiplicand bit) to be used and the sum output from each adder except the adders for the next-to-the-least-significant and the least-significant multiplicand bit are connected to an adder two bit positions and two adder positions (rows) advanced from the adder in which the sum is generated. The sum outputs from the adders for the next-to-the-least-significant bit are connected through a 1-phase delays 82*a*–82*c*, respectively, to the consolidation adder which is three adder positions (rows) advanced from the adder is which the sum is generated and the sum outputs from the adders for the least significant bit are connected to an input of the consolidation adder two adder positions advanced from the sum-generating adder. The first output from the circuit is on sum output line 86*c* from consolidation adder 80*c* with succeeding outputs being on output lines 86*d*, 86*a*, and 86*b*, respectively.

The circuit of FIG. 7 operates in a manner very similar to that of the circuit of FIG. 5 to generate the desired product. FIG. 15 is a chart showing the outputs from the various adders and the phase times at which they occur. Referring to the last column of this chart, it is seen that the first output from the consolidation adders occurs at the first phase 4 time. This output is on sum output line 86*c* from adder 80*c*, and is the lowest-order bit of the desired product. During the succeeding phase times, successively more significant bits of the product are generated on sum output lines 86*d*, 86*a*, 86*b*, and 86*c* until at the third phase 2 time the entire product has been generated.

Figure 8:
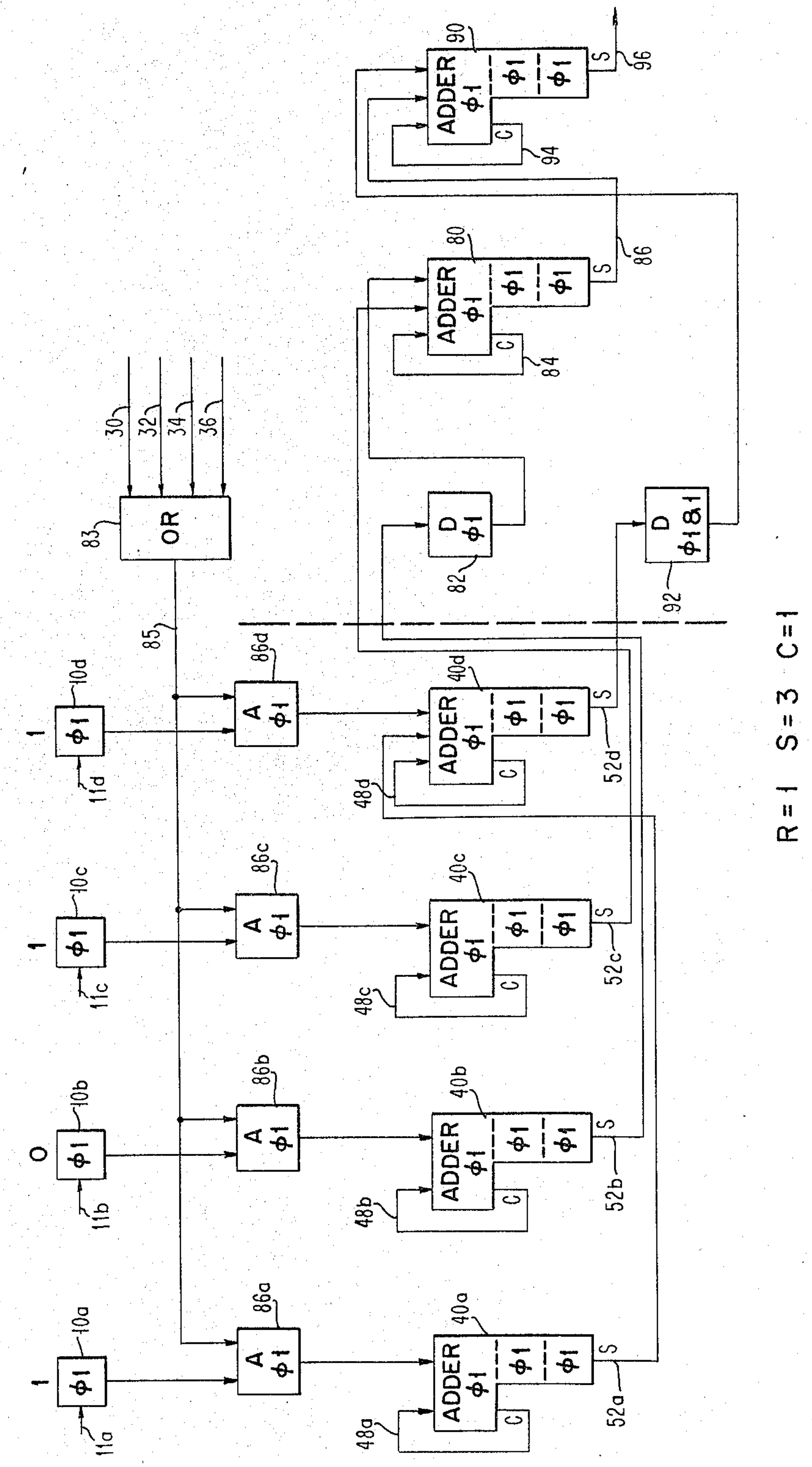

FIG. 8 shows an embodiment of the invention using adders having a carry delay time of 1 and a recycle time of logical elements of 1, but having a sum delay time of 3. Therefore, by the time the sum is generated by an adder, the adders for the next multiplicand bit and the multiplicand bit after that have both completed the add operation which would have utilized this sum. Therefore, in order that this sum be applied to a proper adder without the use of delays, it must be applied to an adder three bit positions advanced from the adder in which it is generated. As will be seen later, this results in the generation of three partial products which must subsequently be consolidated in order to obtain the desired product.

In the circuit of FIG. 8, since R is equal to 1, the logical elements of each adder have been completely recycled at the end of each phase time and the adder is therefore ready to receive inputs at the beginning of each phase time. Therefore, only a single adder 40 per-multiplicand bit is required. Since there are three partial products which must be consolidated, two consolidation adders 80 and 90 are required. The carry output line from each adder, including the consolidation adders is connected as one input to the same adder. The sum output line 52*a* from adder 40*a* is connected as one input to adder 40*d*, the adder three bit positions advanced from it. The sum output line 52*b* from adder 40*b* is connected through a 1-phase delay 82 as a second input to consolidation adder 80. The sum output line 52*c* from adder 40*c* is connected as the third input to adder 80. Sum output line 52*d* from adder 40*d* is connected through 2-phase delay 92 as a second input to consolidation adder 90. The final input to consolidation adder 90 is sum output line 86 from consolidation adder 80. The final product is generated a bit at a time starting with the least significant bit on sum output line 96 from consolidation adder 90. The inputs to the adders from the multiplicand digit circulators 10*a*–10*c* are identical to those shown and described with reference to FIG. 4.

The operation of the circuit shown in FIG. 8 is substantially similar to, but much simpler than, the operation of the circuit shown in FIG. 9. Since the operation of the circuit of FIG. 9 is described, a description of the operation of the circuit of FIG. 8 is not believed to be necessary.

Referring now to FIG. 9, it is seen that the adders used differ from those used in FIG. 8 in that the recycle time of the logical elements used is now two. Therefore, for reasons previously discussed with reference to FIGS. 1 and 5, two adders-per-multiplicand bit are required and two adders of each of the consolidation operations are required. For reasons indicated with reference to FIG. 8, the output from each adder must be applied to an adder three multiplicand bit positions advanced from the adder generating the sum. As with previous circuits, the carry output from each adder is applied to the next adder to be utilized for the same multiplicand bit or the next adder to be used for the same level of consolidation. Sum output line **52*a* from adder 40*a* is connected as the second input to adder 44*d* and sum output line 50*a* from adder 44*a* is connected as a second input to adder 40*d*. Sum output line 52*b* from adder 40*b* is connected through 1-phase delay 82*a* as a second input to consolidation adder 80*a* and sum output line 50*b* from adder 44*b* is connected through 1-phase delay 82*b* as a second input to consolidation adder 80*b*. Sum output line 52*c* from adder 40*c* is connected as the third input to adder 80*b* and sum output line 50*c* from adder 44*c* is connected as the third input to adder 80*a*. Sum output line 52*d* from adder 40*d* is connected through 2-phase delay 92*b* as a second input to adder 90*b* and sum output line 50*d* from adder 44*c* is connected through 2-phase delay 92*a* as a second input to adder 90*a*. The third input to adder 90*b* is sum output line 86*a* from adder 80*a* and the third input to adder 90*a* is sum output line 86*b* from adder 80*b*. The first output from the circuit is on sum output line 96*b* from adder 90*b* and the second output from the circuit is on sum output line 96*a* from adder 90*a***. Successive outputs from the circuit appear alternately on these two sum output lines. The manner of applying the multiplicand bits to the adders under control of the multiplier bits is identical to that shown in FIG. 1.

Before describing the operation of the circuit shown in FIG. 9, reference is made to FIG. 16*b* which shows the manner in which multiplication is performed in the circuits of FIGS. 8–10 and 11*a*–11*b*. As before, the multiplicand 1011 is being multiplied by the multiplier 1011. A first partial product is formed by multiplying the least significant bit and the most significant bit of the multiplicand by the multiplier. A second partial product is formed by multiplying the next-to-the-least-significant bit and every third bit thereafter by the multiplier (in this case, only the next-to-the-least-significant bit). This second partial product is shifted one place to the left and added to the first partial product. A third partial product is formed by multiplying the third-from-the-least-significant bit and every third bit thereafter by the bits of the multiplier (for the example chosen again this involves multiplication of only one bit of the multiplicand). The third partial product is shifted two places to the the left and added to the result of the first consolidation to obtain the final product.

Referring now to FIG. 16*a*, the outputs for the various adders in performing the multiplication of 1011 by 1011 and the phase times at which these outputs occur are shown. Referring to the next-to-the-last column of this chart, it is seen that the fourth phase 2 time, a sum output is obtained on line **96*b* from adder 90*b*. During succeeding phase times, alternate outputs are obtained from adders 90*a* and 90*b* until the desired product is generated. As before, when these outputs are placed in a row with the first output on line 96*b*** as the least significant bit, and 1's are substituted for the sum outputs (S) and 0's for the not-sum outputs, ($\overline{S}$), the proper product 01111001 is obtained.

Figure 10:
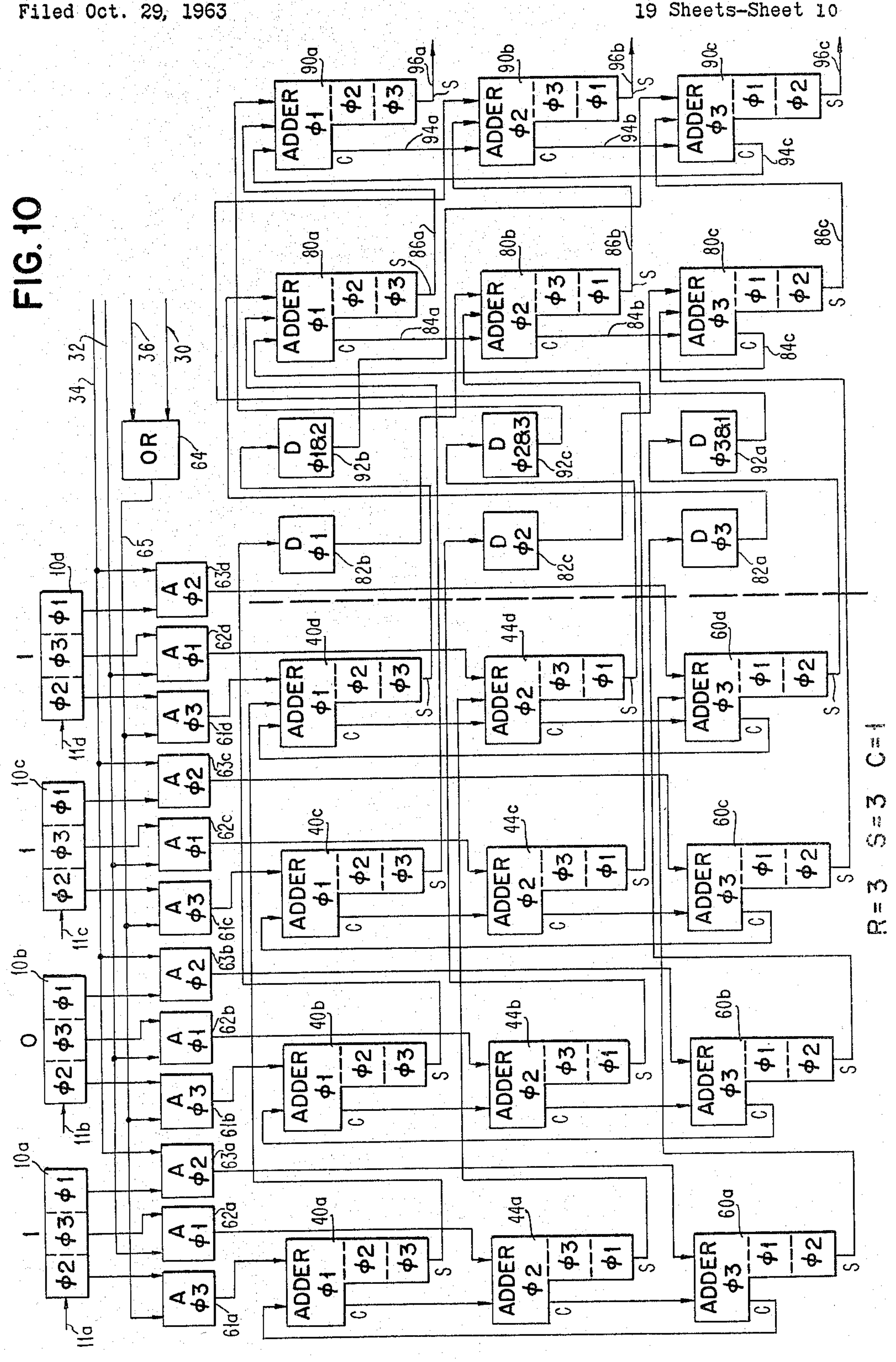

FIGS. 10 and 11*a*–11*b* show circuits which are similar to that shown in FIG. 9, the only difference being that in FIG. 10, R, the recycle time for the logical elements in the adders is equal to 3 and in FIGS. 11*a*–11*b*, R is equal to 4. The increase in the recycle time for the logical elements results in what is now a predictable increase in the number of adders-per-multiplicand bit and the number of adders at each level of consolidation. The reason for this increase in the number of adders has been indicated previously. The operation of the circuit shown in FIGS. 10 and 11*a*–11*b* can easily be deduced from the operation of the circuit shown in FIG. 9, and for this reason will not be described.

As a final example of the way the adders are inter connected for increasing values of R and S, FIG. 12 shows the circuit configuration for a multiplier using adders which generate a sum output in 4 phases, a carry output in 1 phase and have logical elements with a recycle time R of 4. As may be expected, this circuit requires four adders-per-multiplicand bit and four adders per level of consolidation. Also, as may be predicted, the sum output from each adder is applied as one input to an adder four multiplicand bit position advanced and four adder positions advanced from the adder generating sum. Since the circuit results in the generation of four partial products, three levels of consolidation adders are required. As with the circuits of FIGS. 10 and 11*a*–11*b*, the operation of this circuit may be deduced from the operation of previously described circuits and, for this reason, will not be described.

It will be noticed that in all of the circuits shown in FIGS. 1–10, 11*a*–11*b* and 12*a*–12*c*, C, the time required by the adders to generate a carry output, has always been one phase. While optimum circuits may be designed for various values of C, it is not possible to eliminate delays using the exact teachings of this invention unless R and S are integral multiples of C. Therefore, in the previous examples, when C was indicated to be 1 phase, this merely meant that the time necessary to generate a carry is being used as a reference time and could of course be any number of milliseconds, nanoseconds, microseconds, etc.

From the examples shown in FIGS. 1–10, 11*a*–11*b* and 12*a*–12*c*, several conclusions can be drawn. First of all, it is seen that with C equal to 1 phase and S equal to some multiple of C, the number of adders required per multiplicand bit for an optimum multiplier is equal to R, the recycle time of the logical elements in the adder. Secondly, it is seen that with C equal to 1 phase and S equal to some integral multiple of C, the sum output from a given adder is applied to an adder S multiplicand bit positions advanced from and S adder positions advanced from the adder generating the sum, resulting in the formation of S partial products. ($S-1$) consolidation adders are then required to consolidate the S partial products. The two observations indicated above give rise to an algorithm which may be used to design the fastest possible multiplier using adders which have any given R and S.

While any adders, digit circulators, AND gates and OR gates having the indicated characteristics may be used in the circuits shown in FIGS. 1–10, 11*a*–11*b* and 12*a*–12*c* illustrative circuits having the desired characteristics are shown in FIGS. 17–19 and described hereinafter. These circuits utilize majority logic elements.

FIG. 17 shows a four-phase majority-logic digit circulator. The first element in this circuit is a majority logic block 100 having three inputs. The output from this block 100 occurs one phase time after its input and is the same as the inputs applied to a majority (at least two) of the circuit input lines. A suitable tunnel-diode majority-logic element is shown in FIG. 7 of an article entitled, "Some New High-Speed Tunnel-Diode Logic Circuits" by M. S. Axelrod, A. S. Farber, and D. E. Rosenheim in the IBM Journal of Research and Development, Volume 6, No. 2, April 1962, pp. 158–169.

A bit is read into the circuit of FIG. 17 on input line 102 to majority logic block 100. When information is being read into the circuit a 1-bit appears on control line 104. A third input to majority logic block 100 is feedback line 106. When it is desired to erase information stored in the digit circulator, a 0-bit is applied to control line 104 simultaneously with the application of a feedback signal to line 106. If it is desired to continue the bit circulating in the digit circulator, a 1-bit is applied to control line 104 simultaneously with the application of a feedback signal to line 106.

Output line 108 from majority logic block 100 is connected as the input to 1-phase delay 110. An input is applied to delay 110 at phase X time (see top of FIG. 17) and an output is derived from this delay on line 112 at phase $X+1$ time. Line 112 is connected as the input to 1-phase delay 114. An input is applied to 1-phase delay 114 at $X+1$ time an output is derived from this delay on line 116 at phase $X+2$ time. Line 116 is connected as the input to 1-phase delay 118. An input is applied to 1-phase delay 118 at phase $X+2$ time and an output is derived from this delay on feedback line 106 at phase $X+3$ time. Signals on lines 108, 112, 116 and 106, respectively, are available to external circuitry through hubs 120–123, respectively.

If the feedback portion of line 106 is eliminated, then a shift register such as the shift registers *28a–28d* in FIG. 1 is obtained. A three-phase digit circulator such as that shown in FIG. 2 is obtained by eliminating delay 118 and feeding back the signal on line 116 instead of the signal on line 106. Similarly, a 2-phase digit circulator such as digit circulators 10*a*–10*d* in FIG. 1, is obtained by eliminating delays 114 and 118 and feeding back the signal on line 112 instead of the signal on line 106. Finally, a one-phase digit circulator such as that shown in FIG. 4 is obtained by eliminating the delays 110, 114, and 118 and feeding back the signal on line 108 instead of the signal on line 106.

FIG. 18 shows an adder which generates a carry in one phase and a sum in three phases. This adder is suitable for use in the circuits shown in FIGS. 8–10, and 11*a*–11*b*. FIG. 18 also shows the expressions for the sum and carry using majority notations. Referring to FIG. 18, it is seen that the A input on line 130 is applied at phase $X-1$ time (see left of FIG. 18) as one input to 1-phase delay 132, as one input to majority logic block 134, and to inverter block 136. Inverter block 136 also introduces a 1-phase delay. B input line 138 is connected as a second input to majority logic block 134 and as the input to 1-phase delay 140. C input line 142 is connected as the third input to majority logic block 134 and as the input to 1-phase delay 144. At phase X time, delay 132 generates on output signal on line 146 which is applied to the input of delay 148. At this time phase time, inverter 136, delay 140, and delay 144 generate outputs on lines 150–152, respectively, which outputs are applied to the three inputs of a majority logic block 154. Finally, at phase X time, majority logic block 134 generates an output signal on line 156 which is the carry output from the circuit and is also applied as the input to inverter 158. At phase $X+1$ time delay 148, inverter 158 and majority logic block 154 generate output signals on lines 160–162, respectively, which outputs are applied to the three inputs of majority logic block 164. At phase $X+2$ time majority logic block 164 generates an output signal on line 166 which signal is the sum output from the circuit.

FIG. 19 shows a majority-logic adder which is capable of generating a carry in one-phase time and a sum in two phase times. This circuit is suitable for use in the embodiments of the invention shown in FIGS. 4–7.

In the circuit of FIG. 19, a signal at phase $X-1$ (see left of FIG. 19) on A input line 130 is applied as one input to majority logic block 170, as one input to majority block 172, and as the input to 1-phase delay 174. Majority logic block 170 is of the type shown in FIG. 7 of the beforementioned Axelrod, et al. article, and generates an output signal of a polarity which is equal to that of the majority of its inputs. Majority logic block 172 is of the type shown in FIG. 13*b* of the same article and generates an output signal which is of a polarity which is equal to that of the majority of the complement of the X′ input, the Y′ input, and the Z′ input [i.e. M ($\overline{X}$, Y′, Z′)]. At phase X time, majority logic block 170 generates an output signal on line 176 which is the carry output from the circuit and which is also applied as one input to majority logic block 178. At this same phase time majority logic block 172 and delay 174 generate output signals on lines 180 and 182, respectively, which signals are applied to the other two inputs of majority logic circuit 178. Majority logic circuit 178 is also of the type shown in FIG. 13*b* of the Axelrod et al. article and generates an output signal which is of a polarity which is equal that of the majority of the inputs X′, Y′, and Z′. At phase $X+1$ time majority logic circuit 178 generates an output signal on line 184 which signal is the sum output from the circuit.

Since the $M_1$ and $M_2$ majority logic blocks shown in FIGS. 17–19 are described in detail in the Axlerod et al. article, and, since they do not form part of this invention, they will not be described here. All that will be said about these circuits is that, unlike ordinary transistor circuits, these circuits are bilateral devices whose inputs and outputs may be used interchangeably. This requires special isolation techniques to be employed between inputs and outputs. The technique usually employed to obtain signal isolation and a unidirectional flow of information in the circuits is to use the successive phases of a cycle of the power supply to excite the successive ones of the circuits. Therefore, depending on how many phases the A.C. power cycle is broken into, the circuits shown in the Axelrod article may have an R of 1, 2, 3, 4, etc. These majority logic elements are therefore suitable for use in any of the adders shown in FIGS. 1–10, 11*a*–11*b* and 12*a*–12*c*.

While the invention has been particularly shown and described with reference to preferred embodiments thereof, it will be understood by those skilled in the art that various changes in form and details may be made therein without departing from the spirit and scope of the invention.

What is claimed is:

1. A circuit for multiplying an N-bit multiplicand by an M-bit multiplier comprising:

an array of adders with R adders per multiplicand bit, each of said adders having a carry-delay time of C, a sum-delay time of S and a recycle time for its logical elements of R, where S and R are integral multiples of C and at least one of them is greater than C;

means for applying each bit of the multiplicand to the adders for that bit under control of the bits of the multiplier;

means for applying the carry output from each adder to the next adder to be utilized for the same multiplicand bit;

and means for applying the sum output from each adder to the adder S multiplicand bit positions and S adder positions advanced from the adder generating the sum output.

2. A circuit for multiplying an N-bit multiplicand by an M-bit multiplier, said multiplier using carry-save addition and using adders which generate a carry output in one unit of time, a sum output in S units of time and have a repetition rate of R where either S or R may be equal to one but at least one is greater than one, comprising:

an array of adders with R adders per multiplicand bit;

means for applying each multiplicand bit under control of the multiplier bits to one input of the adders for that bit in succession with the multiplicand bit being applied to the first adder one unit of time after it is applied to the last adder for that bit;

means for applying the carry output from each adder to a second input of the next adder to be utilized for the same bit;

means for applying the sum output from an adder to a third input of an adder S bit positions and S adder positions advanced from the adder in which the sum is generated, whereby S partial products are formed;

and means for consolidating said S partial products to obtain the final product.

3. A circuit for multiplying an N-bit multiplicand by an M-bit multiplier comprising:

an array of adders with R adders per multiplicand bit, each of said adders having a carry-delay time of C, a sum-delay time of S and a recycle time for its logical elements of R, where S and R are integral multiples of C and at least one of them is greater than C;

means for applying each bit of the multiplicand to the adders for that bit under control of the bits of the multiplier;

means for applying the carry output from each adder to the next adder to be utilized for the same multiplicand bit;

means for applying the sum output from each adder to the adder S multiplicand bit positions and S adder positions advanced from the adder generating the sum output;

whereby S partial products are formed;

and an array of $R(S-1)$ consolidation adders for consolidating said S partial products into the final product.

4. A circuit for multiplying an N-bit multiplicand by an M-bit multiplier comprising:

an array of adders with R adders per multiplicand bit, each of said adders having a carry-delay time of C, a sum-delay time of S and a recycle time for its logical elements of R, where S and R are integral multiples of C and at least one of them is greater than C;

means for applying each bit of the multiplicand to the adders for that bit under control of the bits of the multiplier;

means for applying the carry output from each adder to the next adder to be utilized for the same multiplicand bit;

means for applying the sum output from each adder for the $(N-S)$ most significant multiplicand bits to the adder S multiplicand bit positions and S adder positions advanced from the adder generating the sum output;

whereby S partial products are formed;

an array of $(S-1)$ groups of R consolidation adders each;

means for applying the carry output from each consolidation adder to one input of the next adder to be utilized in the same group;

means for applying the sum output from the adders for the $S^{th}$-from-the-least-significant bit through a 1-phase delay and from the $(S-1)^{st}$-from-the-least-significant bit to other inputs of the first group of consolidation adders;

means for similarly applying successively less significant bits to the inputs of succeeding groups of consolidation adders;

means for applying the outputs from the above-mentioned groups of consolidation adders to succeeding groups of consolidation adders to form the final product;

and means for applying the outputs from the last group of consolidation adders to an output device.

5. A circuit for multiplying an N-bit multiplicand by an M-bit multiplier comprising:

an array of adders with R adders per multiplicand bit, each of said adders having a carry-delay time of C, a sum-delay time of S, and a recycle time for its logical elements of R, where S is equal to C and R, which is equal to an integral multiple of C, is greater than C;

means for applying each bit of the multiplicand to the adders for that bit under control of the bits of the multiplier;

means for applying the carry output from each adder to the next adder to be utilized for the same multiplicand bit;

means for applying the sum output from each adder to the next adder to be utilized for the adjacent less-significant, multiplicand bit;

and means for applying the sum outputs from the adders for the least significant bit of the multiplicand to an output device.

6. A device of the type described in claim 5 wherein R is equal to 2C.

7. A device of the type described in claim 5 wherein R is equal to 3C.

8. A device of the type described in claim 5 wherein R is equal to 4C.

9. A circuit for multplying an N-bit multiplicand by an M-bit multiplier comprising:

an array of adders with R adders per multiplicand bit, each of said adders having a carry-delay time of C, a sum-delay time of S, and a recycle time for its logical elements of R where S is equal to 2C and R is equal to an integral multiple of C;

means for applying each bit of the multiplicand to the adders for that bit under control of the bits of the multiplier;

means for applying the carry output from each adder to the next adder to be utilized for the same multiplicand bit;

means for applying the sum outputs from the adders for the $(N-2)$ most significant multiplicand bits to the adder 2 multiplicand bit positions and 2 adder positions advanced from the adder generating the sum output;

a group of R consolidation adders;

means for applying the sum outputs from the adders for the next-to-the-least-significant bit through a 1-phase delay to one input of the consolidation adder 3 adder positions advanced from the adder generating the sum output;

means for applying the sum outputs from the adders for the least significant multiplicand bit to a second input of the consolidation adder 2 adder positions advanced from the adder generating the sum output;

means for applying the carry output from a consolidation adder to the next consolidation adder to be utilized;

and means for applying the sum outputs from said consolidation adders to an output device.

10. A device of the type described in claim 9, characterized by R being equal to C.

11. A device of the type described in claim 9, characterized by R being equal to 2C.

12. A device of the type described in claim 9, characterized by R being equal to 3C.

13. A device of the type described in claim 9, characterized by R being equal to 4C.

14. A circuit for multiplying an N-bit multiplicand by an M-bit multiplier comprising:

an array of adders with R adders per multiplicand bit, each of said adders having a carry-delay time of C, a sum-delay time of S, and a recycle time for its logical elements of R, where S is equal to 3C and R is equal to an integral multiple of C;

means for applying each bit of the multiplicand to the adders for that bit under control of the bits of the multiplier;

means for applying the carry output from each adder to the next adder to be utilized for the same multiplicand bit;

means for applying the sum outputs from the adders for the $(N-3)$ most significant multiplicand bits to the adder 3 multiplicand bit positions and 3 adder positions advanced from the adder generating the sum output;

two groups of R consolidation adders each;

means for applying the sum outputs from the second-from-the-least-significant bit through 1-phase delays to one input of the consolidation adder of the first group four adder positions advanced from the adder generating the sum output;

means for applying the sum outputs from the adders for the next-to-the-least-significant multiplicand bit to a second input to the consolidation adders of the first group three adder positions advanced from the adder generating the sum output;

means for applying the sum outputs from the adders for the least significant multiplicand bit through 2-phase delays to one input of the adder of the second group five adder positions advanced from the adder generating the sum output;

means for applying the sum output from a consolidation adder of the first group to a second input of the consolidation adder of the second group three adder positions advanced from the adder generating the sum output;

means for applying the carry output from each consolidation adder to the next consolidation adder to be utilized of the same group;

and means for applying the sum outputs from the consolidation adders of the second group to an output device.

15. A device of the type described in claim 14, characterized by R being equal to 1.

16. A device of the type described in claim 14, characterized by R being equal to 2.

17. A device of the type described in claim 14, characterized by R being equal to 3.

18. A device of the type described in claim 14, characterized by R being equal to 4.

19. A circuit for multiplying an N-bit multiplicand by an M-bit multiplier comprising:

an array of adders with R adders per multiplicated bit, each of said adders having a carry-delay time of C, a sum-delay time of S, and a recycle time for its logical elements of R, where S is equal to 4 and R is equal to an integral multiple of C;

means for applying each bit of the multiplicand to the adders for that bit under control of the bits of the multiplier;

means for applying the carry output from each adder to one input of the next adder to be utilized for the same multiplicand bit;

means for applying the sum output from the adders for the (*N*—4) most significant multiplicand bits to the adder four bit positions and four adder positions advanced from the adder generating the sum;

three groups of R consolidation adders each;

means for applying the sum outputs from the adders for the third-from-the-least-significant multiplicand bit through 1-phase delays to one input of the consolidation adder of the first group five adder positions advanced from the adder generating the sum output;

means for applying the sum outputs from the adders for the second-from-the-least-significant multiplicand bit to a second input of the consolidation adder of the first group four adder positions advanced from the adder generating the sum output;

means for applying the sum outputs from the adders for the next-to-the-least-significant multiplicand bit through 1-phase delays to one input of the consolidation adder of the second group five adder positions advanced from the adder generating the sum output;

means for applying the sum output from the adders of the least significant bit to a second input of the consolidation adder of the second group four adder positions advanced from the adder generating the sum output;

means for applying the sum output from an adder of the first group of consolidation adders through a 2-phase delay to one input of the consolidation adder of the third group six adder positions advanced from the adder generating the sum output;

means for applying the sum output from an adder of the second group of consolidation adders to a second input to the consolidation adder of the third group four adder positions advanced from the adder generating the sum output;

means for applying the carry output from each consolidation adder to the next consolidation adder of the same group to be utilized;

and means for applying the sum outputs from the consolidation adders of the third group to an output device.

20. A device of the type described in claim 19, characterized by R being equal to 4.

References Cited by the Examiner

UNITED STATES PATENTS 2,685,407 8/1954 Robinson ------------ 235—61

OTHER REFERENCES

R. K. Richards: Arithmetic Operations in Digital Computers, Van Nostrand (1955), pp. 155–160.

MALCOLM A. MORRISON, *Primary Examiner.*

K. F. MILDE, *Assistant Examiner.*